United States Patent
Miyamoto et al.

[11] Patent Number: 6,104,165
[45] Date of Patent: Aug. 15, 2000

[54] MULTI-STAGE BATTERY CHARGING SYSTEM

[75] Inventors: Isamu Miyamoto, Tokyo, Japan; Neil Simmonds, British Columbia, Canada

[73] Assignee: Zip Charge Corporation, Tokyo, Japan

[21] Appl. No.: 09/154,683

[22] Filed: Sep. 17, 1998

Related U.S. Application Data

[63] Continuation-in-part of application No. 08/793,467, Mar. 28, 1997, Pat. No. 5,818,202.

[30] Foreign Application Priority Data

Jun. 16, 1995 [JP] Japan ................................ 7-183173
Jun. 17, 1996 [WO] WIPO ....................... PCT/JP96/01655
Sep. 19, 1997 [JP] Japan ................................ 9-254667

[51] Int. Cl.[7] ........................ H01M 10/44; H01M 10/46
[52] U.S. Cl. ............................... 320/125; 320/136
[58] Field of Search ................................ 320/110, 112, 320/120, 125, 132, 134, 138, 136, 143, 152, 155, 159, 160, 162

[56] References Cited

U.S. PATENT DOCUMENTS

| | | | |
|---|---|---|---|
| 5,477,130 | 12/1995 | Hashimoto et al. | 320/164 X |
| 5,608,304 | 3/1997 | Okumura | 320/134 |
| 5,708,350 | 1/1998 | Tibbs | 320/153 |
| 5,729,115 | 3/1998 | Wakefield | 320/112 X |
| 5,818,202 | 10/1998 | Miyamoto et al. | 320/125 |

*Primary Examiner*—Edward H. Tso
*Attorney, Agent, or Firm*—Greer, Burns & Crain, Ltd.

[57] ABSTRACT

In a secondary battery charging system and charging apparatus, when using either a step-down method or a constant-current/constant-voltage method of charging a secondary battery, a switching regulator is used to vary the charging current supplied to a secondary battery in accordance with the duty cycle of one pulse, so that a voltage that exceeds a pre-established voltage value is not applied to the secondary battery.

19 Claims, 13 Drawing Sheets

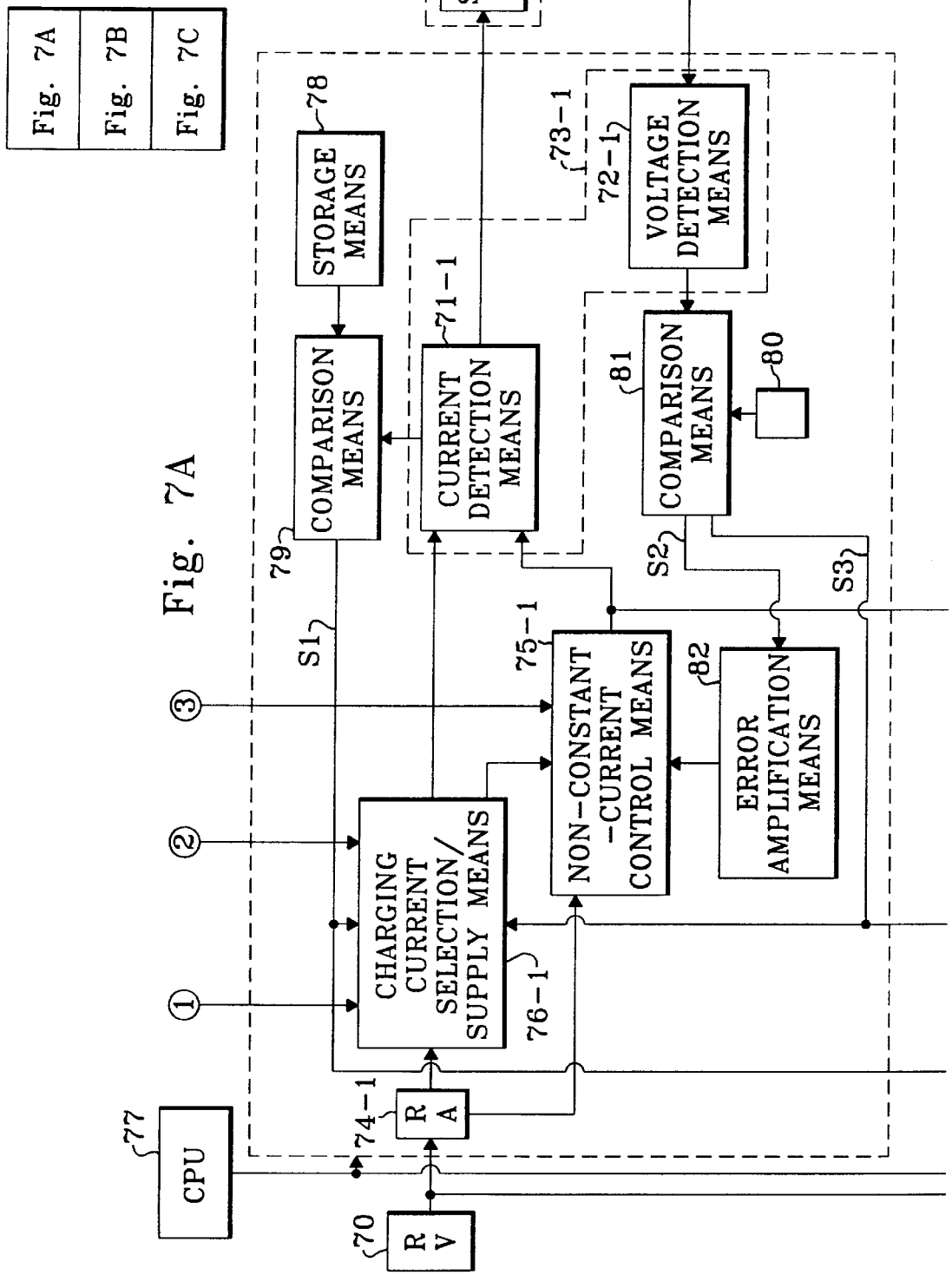

MULTI-STAGE BATTERY CHARGING SYSTEM

This is a continuation-in-part of Ser. No. 08/793,467, filed Mar. 28, 1997 now U.S. Pat. No. 5,818,202.

FIELD OF UTILIZATION IN INDUSTRY

The present invention relates to a charging system for a secondary cell and to a secondary cell charging apparatus, and more specifically to a charging system and secondary cell charging apparatus which, in charging a secondary cell, are capable of causing a secondary cell to achieve a charged state that is close to a full charge, and also of causing the secondary cell to operate with good efficiency at all times, so that a long life is maintained for the secondary cell.

DESCRIPTION OF THE RELATED ART

In general, secondary cells such as lead batteries, nickel-cadmium batteries, nickel-hydrogen batteries, nickel-zinc batteries, and lithium ion batteries are recharged many times over their useful lifetime.

When recharging a secondary cell for the first time, the recharging process requires as much as several hours. That is, in the prior art process of recharging the above-noted secondary cells, 6 hours (or in extreme cases even 16 hours) were required to perform the charging operation, and even with what was called a quick charge, 1 to 2 hours was required.

In the past, when recharging a rechargeable battery of this type known as a battery, a storage battery, or a secondary cell for an intended purpose, although the desire to shorten the charging time as much as possible was known, because of internal temperature and pressure increases within the secondary cell, caused by the principles of chemical reaction occurring within the cell, a limit was reached, and because the drive of a large current through the battery over a short period of time led not only to damage to the battery but to a deterioration of the characteristics, that is, the output characteristics, of the battery, this approach was not taken.

Voltage regulation of lithium ion batteries is particularly difficult, and if the charging process is allowed to proceed so as to exceed a priorly established upper voltage limit, ions precipitate, so that not only does the battery lose its functionality, but also a high temperature is generated, which may lead to the danger of an explosion of the battery.

Because of the difficulty of causing the passage of a large charging current, quick charging of this type of battery in substance was not done.

However, in recent years, the demand for such secondary cells has increased in a large number of industrial fields, and there is an increasing demand for a secondary cell that can be charged quickly, and preferably even instantaneously, particularly in the case of such applications in which a loss of battery power is highly undesirable, such as in machine tool applications, medical equipment for hospitals and the like, and mobile telephone applications.

Therefore, with the continuing increase in consumer equipment which is powered by secondary cells, there has arisen a desire for a system which can recharge a secondary battery in units of minutes rather than units of hours.

While it is possible to quickly charge a secondary cell, in order to prevent irreparable damage to the storage battery, it is necessary to perform even more careful observation and control of the storage battery recharging process, and although in the past there have been various systems developed to enable quick recharging of a secondary battery, these systems do not produce satisfactory results.

For example, in Japanese Examined Patent Publication (KOKOKU) No. 62-23528 and Japanese Examined Patent Publication (KOKOKU ) No. 62-23529, a method of recharging secondary batteries such as nickel-cadmium batteries is disclosed, wherein the variation in the voltage waveform is observed during the recharging operation where a plurality of inflection points which appear in this voltage waveform have been stored beforehand, and when these stored plurality of inflection points appear in a prescribed sequence, the recharging operation is interrupted.

In this method, however, it is necessary to store beforehand for each type of battery the change in the voltage waveform occurring during a charging operation, and to overwrite the stored contents before performing the charging operation, with the above-noted stored information corresponding to the type of battery to be recharged.

In addition to making the operation complex, depending upon the environment in which the charging is performed and the history, for example, of the battery, the voltage output waveform might not necessarily match in sequence and magnitude to the stored information, so that it is not possible to perform a precise charging and recharging operation, making it difficult to perform a high-speed charging operation.

A method is also known for detecting the temperature of a secondary battery, and for controlling the charging process.

However, many of the known methods of the past are not capable of accurately and quickly charging a secondary battery.

Accordingly, an object of the present invention is to improve on the drawbacks of the prior art as noted above, by providing a charging processing system which, when performing an operation of charging various secondary batteries as noted above, accurately detects the time of the secondary battery reaching the fully charged condition or the condition thereof, makes it possible to maintain the secondary battery at the fully charged condition at all times. It is also an object of the present invention to provide a charging processing system and apparatus therefor which, when performing the charging of a secondary battery, enable efficient charging processing.

In particular an object of the present invention is to provide a charging processing system which particularly enables charging of lithium ion batteries and lead batteries within 100 minutes, and which also enables charging of other secondary battery types in from ten to several tens of minutes.

To achieve the above-noted object, the present invention has the following basic technical constitution. Specifically, in a first aspect of a charging method for secondary batteries, including lithium ion batteries, according to the present invention, at a first stage a prescribed charging current C1, expressed as a C rate, is supplied to the secondary battery, the output voltage of the secondary battery is monitored and, when the output voltage of the secondary battery reaches a pre-established voltage value, transition is made to a second stage, at which a charging current C2 which is 1/N of C1 (where N is an arbitrary integer value or a real value with a decimal part), which was the current used in the first stage, is supplied to the secondary battery and, when the output voltage of the secondary battery reaches a pre-established voltage that is one and the same with the above-noted pre-established voltage, a transition is made to a third stage, at which a charging current C3 which is 1/M of C2 (where M is an arbitrary integer value or a real value with a decimal part and can also be equal to N), which was the current used in the first stage, is supplied to the secondary battery and thereafter same is performed, so that each time the output voltage of the secondary battery reaches a pre-established voltage value, the charging current that is supplied to the secondary battery is reduced by a prescribed ratio as charging of the secondary battery proceeds.

Furthermore, in using a charging method which employs a switching regulator which causes the amount of this charging current to vary in accordance with the duty cycle of one pulse, this is a method in which the configuration is such that a protective circuit is provided so that a voltage greater than the pre-established voltage value is not applied to the output terminal of the secondary battery.

In a second aspect of a charging method for secondary batteries according to the present invention, at a first stage a constant current charging of the secondary battery is performed, during which time period the output voltage of the secondary battery gradually increases and, when the output voltage of the secondary battery reaches a pre-established voltage value, a switch is made to constant voltage charging operation, during which time period the charging current is caused to decrease gradually and, when this charging current falls below a pre-established current value, the charging operation with respect to the secondary battery is caused to stop.

Furthermore, in using a charging method which employs a switching regulator which causes the amount of this charging voltage to vary in accordance with the duty cycle of one pulse, this is a method in which the configuration is such that a protective circuit is provided so that a voltage greater than the pre-established voltage value is not applied to the output terminal of the secondary battery.

In a third aspect of a secondary battery charging apparatus according to the present invention, there is a secondary battery insertion part into which a plurality of secondary battery packs are simultaneously mounted, a voltage/current detection means which separately detects the output voltage from and the charging current supplied to each of the secondary batteries provided in the insertion secondary battery pack insertion part, a constant-current source, a constant-voltage source, a charging current supplying means which selectively supplies a charging current to the plurality of secondary batteries, and a charging processing control means. The charging processing control means is provided with a charging operation stage identification means that identifies a first stage in which the secondary batteries receive a charging operation from the constant-current source and a second stage in which the secondary batteries receive a charging operation from the constant-voltage source. The configuration of the above is arranged so that, responsive to a voltage value or a charging current value detected in each of the secondary battery packs, at a point in time at which the first stage charging operation with respect to a first secondary battery is started, the charging operation with respect to a second secondary battery is not started, and at a point in time at which a transition is made to a second stage of charging operation with respect to the first secondary battery, a first preparatory charging operation with respect to the second secondary battery is started, whereby a charging current is supplied thereto, this current being a value that is the charging current supplied in the second stage to the first secondary battery subtracted from the maximum charging current in the first stage which is supplied to the first secondary battery, and at a point in time at which a transition is made to a third stage of the charging operation with respect to the first secondary battery, or at a point in time at which the charging operation with respect to the first secondary battery is completed, either a second preparatory charging operation with respect to the second secondary battery is started, whereby a charging current is supplied thereto, this current being a value that is the charging current supplied in the third stage to the first secondary battery subtracted from the maximum charging-current in the first stage which is supplied to the first secondary battery, or a charging operation is repeated which causes the start of a first stage charging operation with respect to the second secondary battery.

By adopting the above-noted technical constitution, a charging processing system and secondary battery charging apparatus according to the present invention is capable of executing high-speed charging of a secondary battery so as to achieve nearly a fully charged condition in a short period of time. In particular with respect to secondary batteries such as lithium ion batteries, by sensing and controlling the charged condition accurately, it provides a charging processing method and apparatus that safely and reliably achieves a fully charged condition. Additionally, by performing the charging operation simultaneously with respect to a plurality of secondary batteries, it enables execution of overall charging of the secondary batteries in a short period of time.

DESCRIPTION OF THE PREFERRED EMBODIMENTS

Figure 1:
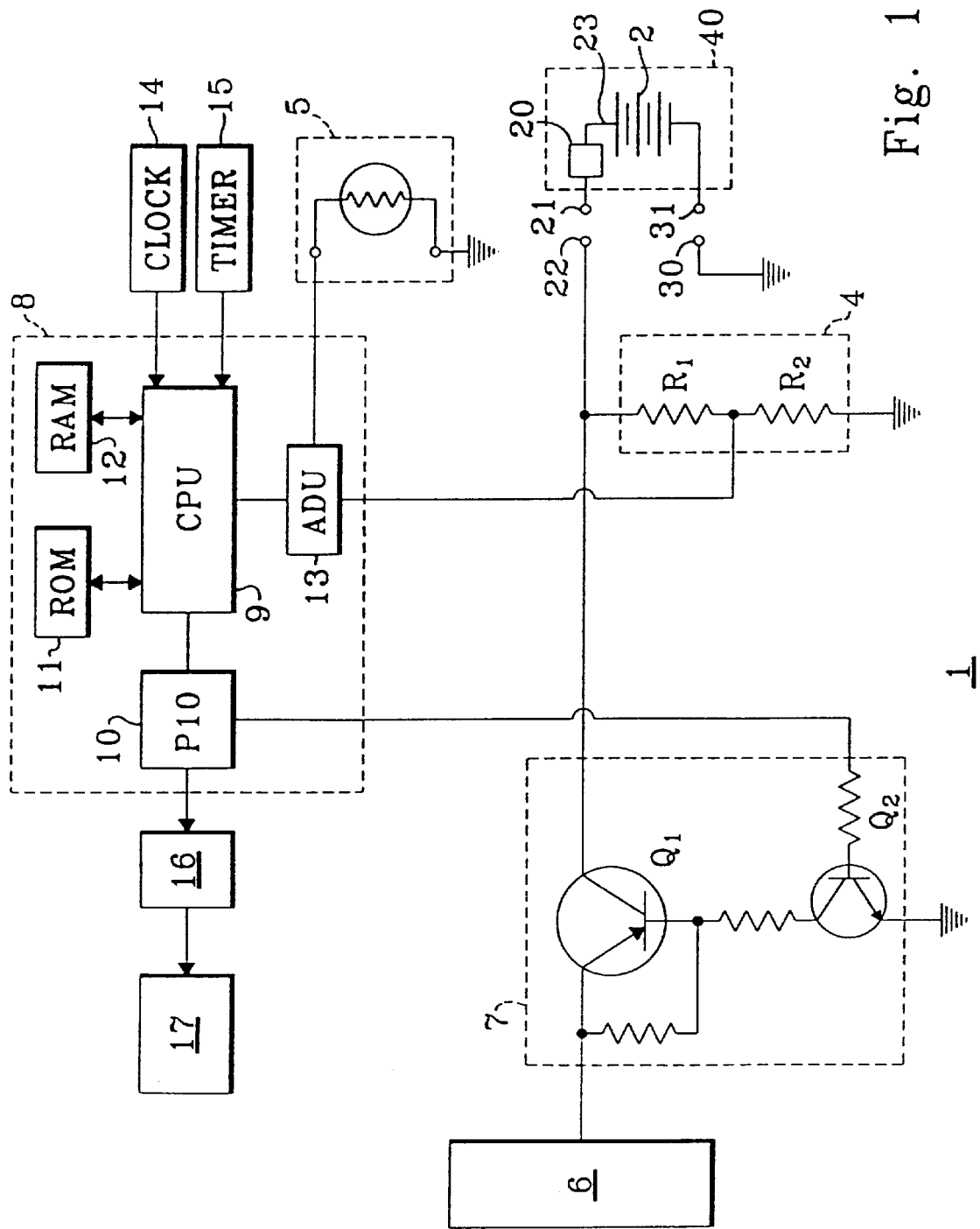
FIG. 1 is a block diagram that shows an example of the basic configuration of a charging processing system according to the present invention.

Preferred embodiments of a charging processing system and secondary battery charging apparatus are described below, with reference being made to relevant accompanying drawings.

The inventor of the present invention understands the problems involved in performing a charging operation with respect to a secondary battery in the past, and to achieve a charging method and a charging apparatus that is capable of achieving high charging efficiency and reliable and safe charging to 100% in a short period of time, the inventor conceived of the above-noted secondary battery charging method and charging apparatus having the objects described above.

With regard to the specific examples to be noted below, although the examples presented are for the case of a lithium ion battery, the application for the present invention is not restricted to the case of the lithium ion batteries, and it shall be obvious that it can be applied to secondary batteries that are generally known at this time. That is, in a charging processing method that is the first aspect of the present invention, at a first stage a prescribed charging current C1, expressed as a C rate, is supplied to a secondary battery, the output voltage of the secondary battery is monitored and, when the output voltage of the secondary battery reaches a pre-established voltage value, transition is made to a second stage, at which a charging current C2 which is 1/N of C1 (where N is an arbitrary integer value or a real value with a decimal part), which was the current used in the first stage, is supplied to the secondary battery and, when the output voltage of the secondary battery reaches a pre-established voltage that is one and the same with the above-noted pre-established voltage, a transition is made to a third stage, at which a charging current C3 which is 1/M of C2 (where M is an arbitrary integer value or a real value with a decimal part and can also be equal to N), which was the current used in the second stage, is supplied to the secondary battery and thereafter the same is performed, so that each time the output voltage of the secondary battery reaches a pre-established voltage value, the charging current that is supplied to the secondary battery is reduced by a prescribed ratio as charging of the secondary battery proceeds. The configuration is such that, in the case in which the charging current supplied to the secondary battery drops below a prescribed amount, the charging operation with respect to the secondary battery is stopped and, in using a charging method which employs a switching regulator which causes the amount of this charging current to vary in accordance with the duty cycle of one pulse, this is a method in which the configuration is such that a protective circuit is provided so that a voltage that is greater than the pre-established voltage value is not applied to the output terminal of the secondary battery.

The basic charging method with respect to a secondary battery according to the present invention is the method of charging by the step-down method, as already noted by the applicant in this case, in the Japanese Patent Application H7-183173, this method being particular superior with respect to lithium ion batteries.

The present invention is an improvement which enables the above-noted step-down method to be employed with better efficiency, and, in consideration of the fact that, there is a dangerous condition that occurs in particular when a high charging voltage that exceeds a pre-established voltage value is applied to a lithium battery, an investigation was performed as to how to accurately stop the charging operation with respect to a secondary battery in a condition that is close to the rated voltage value, this investigation obtaining the favorable results disclosed herein.

Specifically, in executing the above-noted step-down method, a switching regulator is used, the duty cycle of a pulse voltage that is output from the switching regulator is varied, thereby varying the value of charging current and charging voltage that are applied to the secondary battery.

By using the above-noted method, the control circuit that is required is simplified, and the generation of an accurate charging current and charging voltage is facilitated.

This in turn facilitates the control operation in a condition in which it is necessary to finely adjust the charging voltage and the charging current values.

By taking a long-term average of the charging voltage and charging current values that are obtained by the present invention by using a switching regulator, it is possible to calculate the required voltage or current.

In the case of using a switching regulator, however, there is a problem with regard to ripple voltage.

During a period of time at which the charging voltage with respect to the secondary battery is a low voltage level with respect to the maximum allowable voltage of the secondary battery, this ripple voltage is not much of a problem. However, when the secondary battery charging voltage approaches the maximum allowable voltage value, this ripple voltage can exceed the maximum allowable charging voltage of the secondary battery, in which case the above-noted problem arises.

For this reason, although the step-down method, which is the basic technical idea of the present invention, is used, this being superior from the standpoint of reducing the chance that the ripple voltage will exceed the maximum allowable charging voltage of the secondary battery, even if a switching regulator is used, because the maximum allowable voltage value of the secondary battery is approached for each stage at the end of each step, this danger is not entirely eliminated.

For this reason, in the present invention, a control zone is established, this being ±1% with respect to the maximum voltage value of the secondary battery that is recommended by the manufacturer thereof, and in the case in which the charging voltage of the secondary battery is reached to within this range, a judgment is made that the charging voltage value has reached a pre-established voltage value, this resulting in the next step-down operation.

Figure 5:
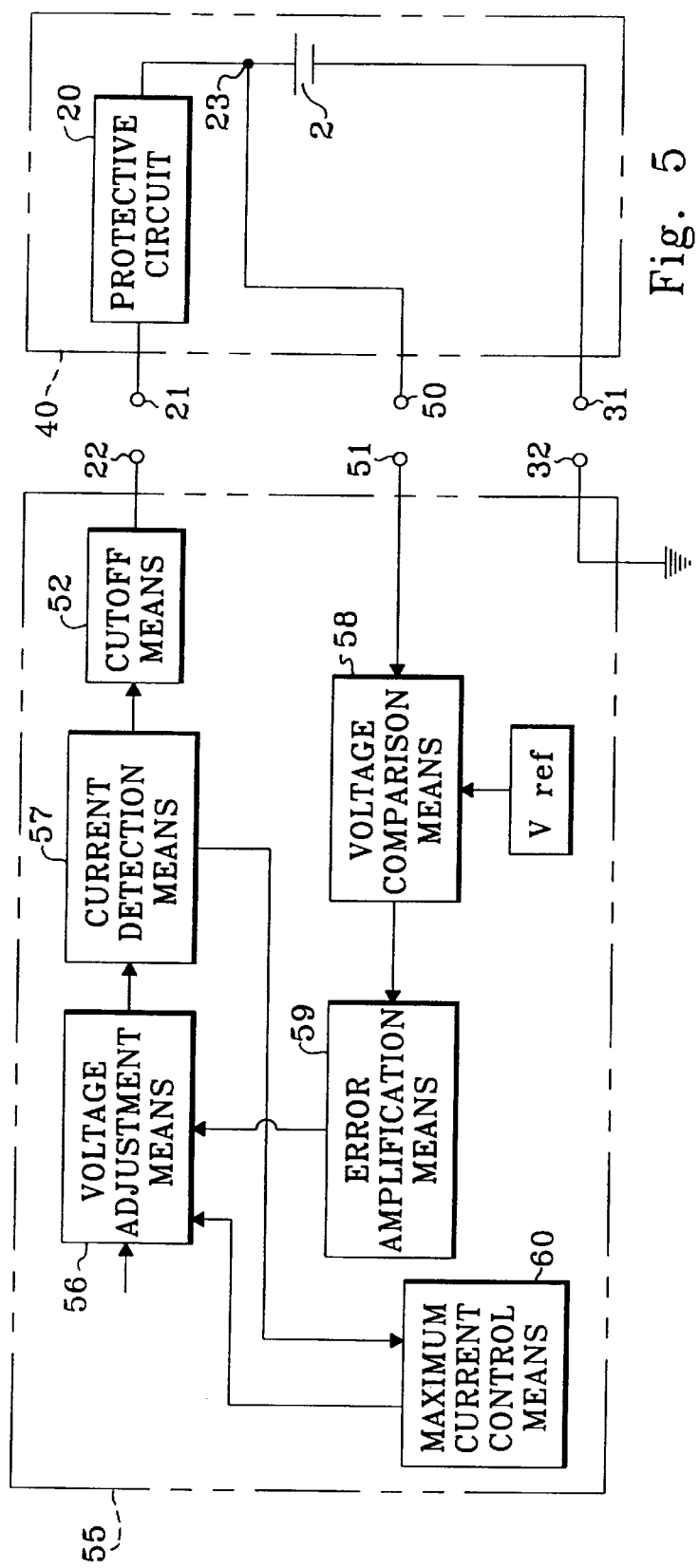
FIG. 5 is a block diagram that shows the configuration of another specific example of a secondary battery charging apparatus according to the present invention, in which the right-hand side is a block diagram that shows the configuration of a secondary battery pack, and the left-hand side is a block diagram that shows an example of the configuration of a charging apparatus

Th charging processing operation with respect to the secondary battery, for example as shown in FIG. 1, can be carried out by an apparatus that is one and the same as the charging apparatus that is proposed by the block diagram of FIG. 5 and noted in the Japanese Patent Application H7-183173, which was filed by the applicant which is filing this application.

Figure 2:
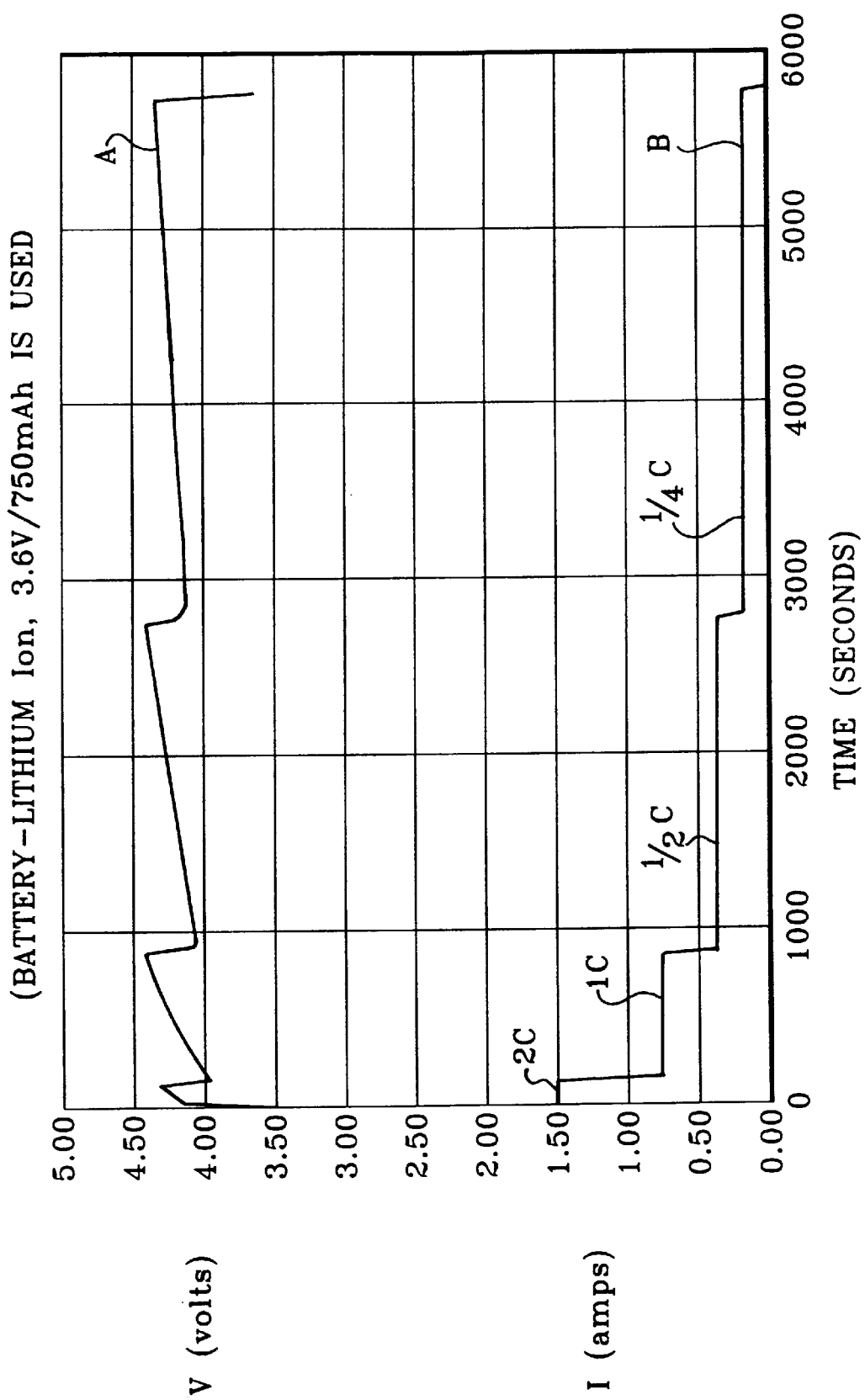
FIG. 2 is a graph that shows the condition of change in the charging voltage and the charging current in a charging processing system that uses a step-down method according to the present invention.

The change of the charging voltage value and charging current value of the secondary battery obtained by doing so, as shown in FIG. 2, is in the same condition as FIG. 14 which is shown in the specification of the above-noted patent application.

Figure 3:
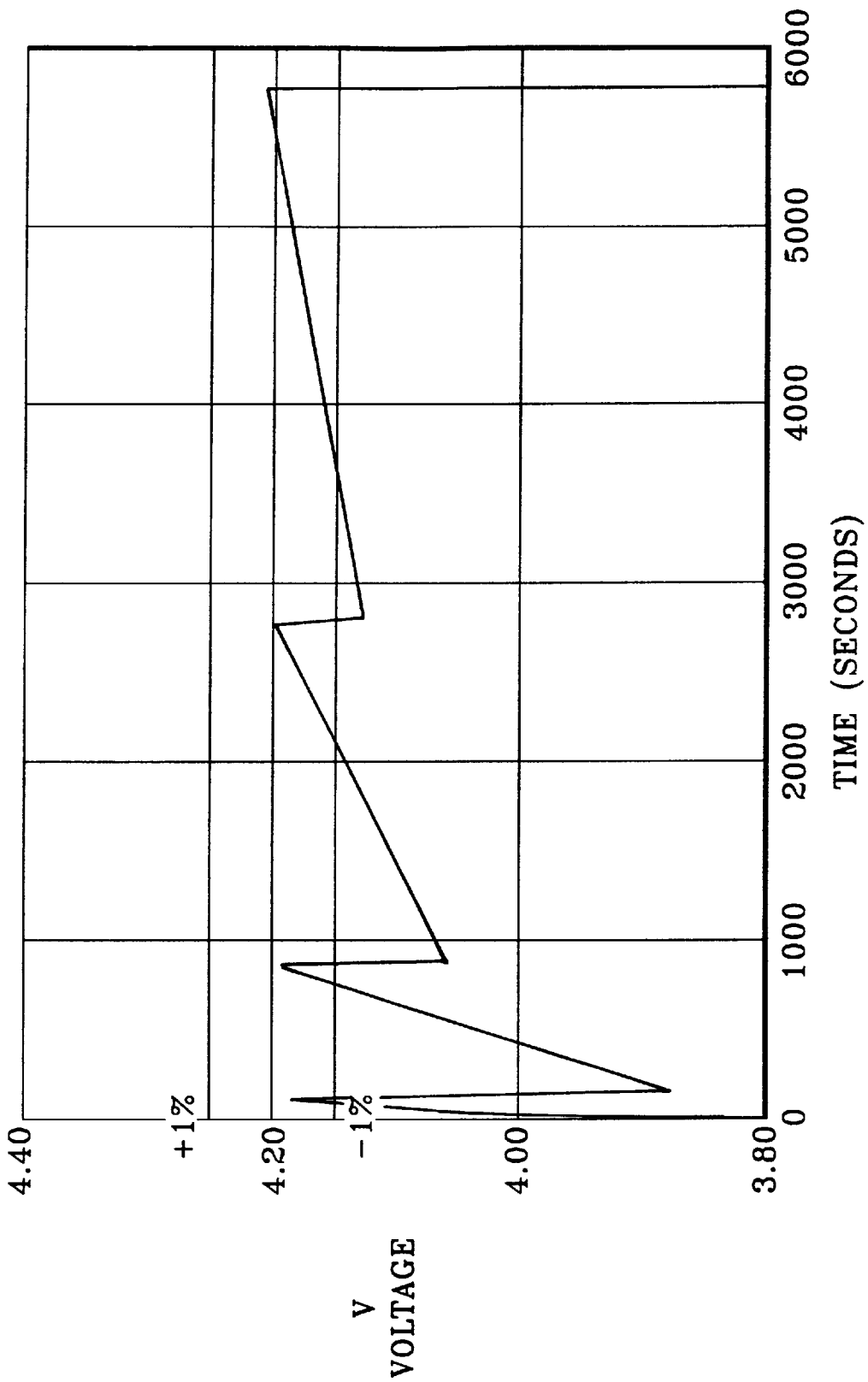
FIG. 3 is a graph that illustrates a specific example of a control method in a charging processing system that uses a step-down method according to the present invention.

FIG. 3 is a graph which shows an example of the case of performing a charging operation with respect to the secondary battery shown in FIG. 1 and FIG. 2 using the charging processing control according to the present invention. This shows the case of charging a lithium battery for which the manufacture recommends a maximum allowable voltage of 4.2 V, under the condition of 3.6 V/750 mAh. Charging was done with the allowable range or charging voltage of this lithium battery set to ±1% with respect to 4.2 V.

The results of an experiment indicate that, in the case in which the charging voltage of the secondary battery exceeds the control range of ±1% with respect to 4.2 V, a drop in capacity is observed, and sufficient charging is not achieved.

In another aspect of the secondary battery charging method according to the present invention, instead of the above-noted step-down method of charging, a so-called constant-voltage/constant-current charging method is employed.

Specifically, in this example of a method of charging a secondary battery, including charging of a lithium ion battery, at a first stage the secondary battery is charged by a constant current, during which time period the output voltage of the secondary battery increases gradually.

When the output voltage of the secondary battery reaches a prescribed voltage value, a switch is made to constant-voltage charging operation, during which period the charging current is caused to decrease gradually. The configuration is such that when the amount of the charging current falls below a pre-established current value, the charging of the secondary battery is stopped. In this secondary battery charging method, a switching regulator is used to vary the charging current supplied to the secondary battery, in accordance with the duty cycle of one pulse.

In the case in which a switching regulator is used to perform control of the charging voltage and the charging current in a charging method using the constant-voltage/constant-current method utilizing the switch regulator, in the case in which the constant-voltage control mode, which is the second stage, is entered, because the constant-voltage value is set so as to coincide with the manufacturer's recommended maximum allowable voltage value for the secondary battery, there is an extremely large opportunity for the above-noted ripple voltage to exceed this maximum allowable voltage value, so that there is a high risk of going into a dangerous condition.

In this example of the present invention, therefor, an allowable range is set, similar to the above-noted example and, in the case in which the output voltage value of the secondary battery is within the range of ±1% with respect to the output voltage rating value of the secondary battery, the charging voltage with respect to the secondary battery is adjusted and by the switching regulator so that it is reduced.

Figure 4:
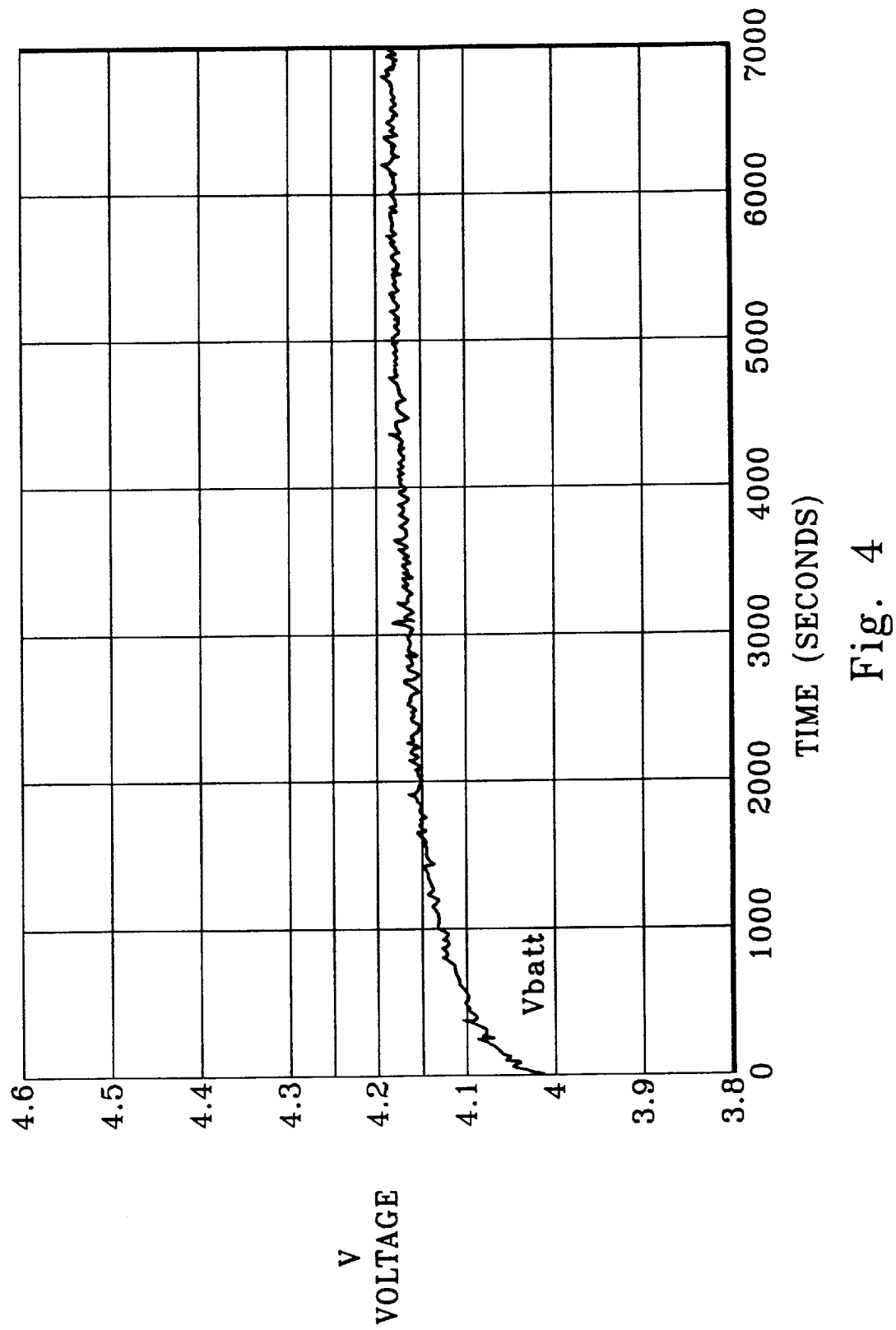
FIG. 4 is a graph that illustrates a specific example of a control method in a charging processing system that uses a constant-current and constant-voltage method according to the present invention.

The change in the charging voltage value of the secondary battery, based on charging operation according to the present invention, is shown in FIG. 4, from which it is clear that, although the charging voltage value of the secondary battery is quite low at first, it quickly enters a range of ±1% with respect to 4.2 V, after which it is reliably controlled so that it does not exceed 4.2 V.

In a third aspect of the present invention, a protective circuit is provided at an output terminal of the secondary battery of either of the previously described examples, so that a voltage which exceeds a preestablished voltage value is not applied to the secondary battery.

That is, in the two above-noted examples, even if quite good control is performed of the charging voltage value, it is not possible to completely prevent and to entirely rule out the chance that, for some reason, the control of the charging voltage value is not performed properly, thereby resulting in a charging voltage being applied to the secondary battery which exceeds the allowable maximum value.

In contrast, in this example even in the case in which such an abnormal condition occurs, a protective circuit that has a limiter function or a switching function is provided at the power supply input/output terminal part of the secondary battery, so that a voltage that exceeds the allowable value is not applied to the secondary battery.

The circuit configuration of the above-noted protective circuit is not limited to a particular configuration. This protective circuit can be, for example, a known limiter circuit, or a circuit formed by the combination of a voltage detection means and a switching means.

More specifically, it is desirable that the above-noted protective circuit be disposed at the location that is indicated as 20 in FIG. 1.

That is, in the case in which the secondary battery 2 is mounted in a prescribed charging apparatus 1, it is desirable that this be configured so that it is connected in series with the power supply terminal 22 of the charging apparatus 1 and the terminal part 23 of the secondary battery.

More specifically, in a secondary battery pack 10 that includes a secondary battery 2, the configuration is such that the external connection terminal parts 21 and 31 of the secondary battery pack 40 are connected to the power supply terminal 22 and a ground terminal 32, respectively, and the protective circuit 20 is connected in series between the first external connection terminal 21 of the secondary battery pack 40 and the output terminal 23 of the secondary battery.

By adopting the above-noted configuration, in the secondary battery it is possible to reliably avoid the danger that a pre-established voltage will be inadvertently applied to the output terminal part of the secondary battery 2, and this function is extremely effective with regard to a lithium battery.

In the case in which the above-noted protective circuit is also used, it was discovered that another problem arises.

Specifically, by mounting the above-noted protective circuit within the secondary battery pack 40 to limit the voltage applied to the output terminal 23 of the secondary battery, what occurs is that the characteristic internal resistance of the protective circuit acts so that there is a voltage drop based on that internal resistance in the protective circuit.

Therefore, even if the charging voltage from the power supply terminal 22 on the charging apparatus side is output as an accurately controlled voltage, all that is applied to the output terminal 23 of the secondary battery 2 is the voltage value minus the above-noted voltage drop, the result being that, because the charging operation controlled at the charging apparatus side is not executed accurately at the secondary battery 2, it is not possible to perform an accurate charging operation.

This internal resistance of the protective circuit depends upon the configuration of the protection circuit, and also differs between manufacturers. Furthermore, even for protective circuits having the same configuration, variations between individual components thereof will prevent correlation between the overall internal resistances thereof.

That is, except in the case in which a large cost can be tolerated, it is substantially difficult to verify the internal resistance of the protective circuit 20.

Therefore, another specific example of the present invention provides a method for performing accurate charging processing, even if it is not possible to accurately determine the internal resistance of the protective circuit.

Specifically, in this example, the basic technical concept is one by which the configuration is such that, when supplying a prescribed charging voltage to the output terminal part 23 of the secondary battery from the power supply terminal 22 of the charging apparatus 1, a voltage which is compensated by the amount of the voltage drop of the protective circuit 20 is applied to the output terminal 23 of the secondary battery 2 from the power supply terminal 22 of the charging apparatus 1.

More specifically, as shown in FIG. 5, in addition to providing a third terminal part 50 which is connected to the output terminal 23 of the secondary battery 2 separately from the external connection terminal 21 that is connected to the protective circuit 20 and by also providing an auxiliary terminal 51 that connects with the third terminal 50 of the secondary battery 2 on the charging apparatus side, the true output voltage value of the secondary battery 2 at the charging apparatus can be monitored via this third terminal part 50 and auxiliary terminal 51.

That is, in this example of the present invention, the true output voltage value of the secondary battery 2 that is detected by the auxiliary terminal 51 is compared with the target reference voltage value Vref of the secondary battery, the difference therebetween is taken, and voltage compensation is performed with respect to the voltage value that is applied to the protective circuit 20, so that this difference component made zero.

That is, in a charging processing system for a secondary battery according to this example of the present invention, the secondary battery pack 40 is provided with a first terminal part 21 that forms an input terminal of the protective circuit 20 that is connected to the output terminal part 23 of the secondary battery 2, a second terminal part 31 that is connected to a negative terminal part of the secondary battery 2, and a third terminal part 50 that is directly connected to the output terminal part 23 of the secondary battery 2. On the charging apparatus 1 side, a positive terminal part 22 and a negative terminal part 32, which make physical contact, respectively, with the first and second terminal parts 21 and 31 provided on the secondary battery pack 2, are provided, and additionally an auxiliary terminal 51 is provided which makes physical contact with the third terminal part 50. A control means 55 is additionally provided which, in response to the voltage value of the output terminal part 23 of the secondary battery 2 that is detected by the auxiliary terminal part 51, performs control so that a voltage from the positive terminal part 23 that is compensated for the voltage drop of the protective circuit 20 is applied to the first terminal part 21.

Using the above-noted constant-current/constant-voltage method, the above-noted target reference voltage value Vref can be established as the maximum allowable voltage value recommended by the manufacturer of the secondary battery, and using the above-noted step-down method, it is desirable that this target reference voltage value Vref be variably and selectively set beforehand as a plurality of different voltage values.

Furthermore, in the above-noted example of the present invention, in the case in which the current true voltage 40 is detected from the third terminal part 50 that is provided on the secondary battery pack, it is preferable that the voltage that is supplied to the protective circuit 20 be temporarily cut off, and for this reason it is desirable that an appropriate cutoff means 52 be provided to the power supply terminal 22 in the charging apparatus 1, for example as shown in FIG. 5.

The above-noted control means 55 in the above-noted example of the present invention is formed, for example, by a voltage adjustment means 56 that is connected to a power supply (not shown in the drawing), a current detection means 57 that is connected to the voltage adjustment means, and that has its output connected to the positive terminal part 22, a voltage comparison means 58 that is connected to the auxiliary terminal part 51 and is also connected to a prescribed reference voltage source Vref, an error amplification means 59 that has its input connected to the output of the voltage comparison means 58 and which has its output connected to the voltage adjustment means 56, and a maximum current control means 60 that has its input connected to the current detection means 57 and its output connected to the voltage adjustment means 56.

That is, in this example of the present invention, the true voltage value of the output terminal 23 of the secondary battery 2 that is output at the third terminal part 50 of the secondary battery 2 is first monitored at the auxiliary terminal 51, and a comparison is performed between this monitored voltage value and the above-noted target reference voltage value Vref by the voltage comparison means 58.

In the case in which the secondary battery 2 is a lithium ion battery, the target reference voltage value Vref can be set, for example, to 4.2 V.

As a result of the comparison at the voltage comparison means 58, if there is seen to be a difference between the two voltage data, the value of the difference therebetween is sent to the voltage adjustment means 56 via the error amplification means 59, and at this voltage adjustment means 56 control is performed so that a voltage is output and applied at the positive terminal part 22 so that this difference value is zero.

It is desirable that the above-noted operation is executed intermittently at a prescribed time interval and that when monitoring the voltage of the third terminal part, as described above, the supply of current with respect to the first terminal 21 of the secondary battery pack 40 be temporarily stopped.

Additionally, while in the above-noted example the required amount of charging current is constantly being supplied from an appropriate power supply (not shown in the drawings) to the first terminal part 21 of the secondary battery pack 40 via the voltage adjustment means 56, in either of the above-noted methods of performing charging, at the first stage the charging voltage of the secondary battery is increased with a constant current until it reaches a pre-established prescribed voltage, during which time period whether or not a constant current is flowing is monitored by the current detection means 57, the results therefrom being reported to the maximum current control means 60.

At the maximum current control means 60 a judgment is made as to whether or not the charging current which is monitored at the current detection means is the pre-established prescribed maximum current (constant current) and, if the amount of current is smaller, an instruction is issued so that the output voltage from the voltage adjustment means 56 is increased. If, however, the charging current is judged to be exceeding the prescribed maximum current (constant current), an instruction is issued so as to limit the amount of current to that set value.

At the second stage in the charging operation in this example of the present invention, since charging is mainly done by constant-voltage processing, the voltage adjustment means 56, in response to the difference value, which is the output of the error amplification means 59, executes operation so as to reduce the amount of current, so that this difference amount is made to equal zero.

In the present invention as a result of an investigation with regard to the use of the above-noted example to achieve an even further substantial reduction in the charging time for a secondary battery by improving the efficiency of the processing of charging the secondary battery, as is described below, it was discovered that by mounting a plurality of secondary batteries in one charging apparatus and performing the above-noted first stage and second stage charging processing and, if necessary, third stage and fourth stage charging processing, it is possible to perform efficient execution of the charging processing.

Specifically, yet another example of the present invention is a method of performing charging using a charging apparatus into which a plurality of secondary batteries are mounted simultaneously, one aspect thereof being a method of charging a secondary battery, wherein at a first stage a prescribed charging current C1, which is expressed as a C rate, is supplied to the secondary battery, the output voltage of the secondary battery being monitored and, when the output voltage of the second battery reaches a pre-established voltage value, transition is made to a second stage, at which a charging current C2 which is 1/N of N (where N is an arbitrary integer value or a real value with a decimal part), which was the current used in the first stage, is supplied to the secondary battery and, when the output voltage of the secondary battery reaches a pre-established voltage that is one and the same with the above-noted pre-established voltage, a transition is made to a third stage, at which a charging current C3 which is 1/M of C2 (where M is an arbitrary integer value or a real value with a decimal part and can also be equal to M), which was the current used in the second stage is supplied to the secondary battery and thereafter the same is performed, so that each time the output voltage of the secondary battery reaches a pre-established voltage value, the charging current that is supplied to the secondary battery is reduced by a prescribed ratio as charging of the secondary battery proceeds.

In a secondary battery charging apparatus in which a method of stopping the charging processing with respect to the secondary battery in the case in which the charging current falls below a preestablished current value, or at the point in time at which a preestablished number of stages have elapsed, or if the charging current drops below a prescribed value, in performing charging of a plurality of secondary batteries using the same charging apparatus, at the point in time at which the first stage charging operation with respect to a first secondary battery is started, the charging operation with respect to a second secondary battery is not started, and at a point in time at which a transition Is made to a second stage of charging operation with respect to the first secondary battery, a first preparatory charging operation with respect to the second secondary battery is started, whereby a charging current is supplied thereto, this current being a value that is the charging current supplied in the second stage to the first secondary battery subtracted from the maximum charging current in the first state which is supplied to the first secondary battery, and at a point in time at which a transition is made to a third stage of charging operation with respect to the first secondary battery, a secondary preparatory charging operation with respect to the second secondary battery is started, whereby a charging current is supplied thereto, this current being a value that is the charging current supplied in the third stage to the first secondary battery subtracted from the maximum charging current in the first stage which is supplied to the first secondary battery, after which the same operations are performed and, when the charging operation with respect to the first secondary battery proceeds to the next stage, a charging current that is the charging current that is supplied to the secondary battery in the next stage subtracted from the maximum charging current in the first stage supplied to the first secondary battery is supplied to the second secondary battery, a plurality of preparatory charging operations being executed until the charging operation with respect to the first secondary battery is completed and, at the point in time at which the charging of the first secondary battery is completed, the main charging operation with respect to the second secondary battery is started.

In a second aspect of this specific example of the present invention, at a first stage the secondary battery charged by constant-current charging operation, during which time period the output voltage of this secondary battery gradually increases and, when the output voltage value of the secondary battery reaches a prescribed voltage value, the second stage is entered, in which stage a switch is made to constant-voltage charging operation, during which time period the charging current is caused to decrease gradually and, when the amount of the charging current falls below a pre-established current value, the charging operation with respect to the secondary battery is ended.

In a charging apparatus that executes a secondary battery charging method as noted above, when charging a plurality of secondary batteries with one and the same charging apparatus, at a point in time at which the first stage charging operation with respect to the first secondary battery is started, the charging operation with respect to the second secondary battery is not started and, at a point in time at which a transition is made to the second stage of charging with respect to the first secondary battery, a preparatory charging operation is started with respect to the second secondary battery by supplying thereto a charging current that is the charging current that is supplied to the first secondary battery in the second stage subtracted from the maximum charging current in the first stage that is supplied to the first secondary battery, and at the point in time at which the charging operation with respect to the first secondary battery is completed, the preparatory charging operation with respect to the second secondary battery is stopped, simultaneously with which the first stage of charging operation with respect to the second secondary battery is started, after which the second stage of charging operation with respect to the first secondary battery is executed.

In the above-noted examples of the present invention, the basic technical concept is the same, this being applied to both the above-noted constant-current/constant-voltage system and step-down system.

At this point, a specific example of an apparatus which executes a charging operation with respect to a plurality of secondary batteries simultaneously will be described, with references being made to FIG. 6 and FIG. 7.

Figure 6:
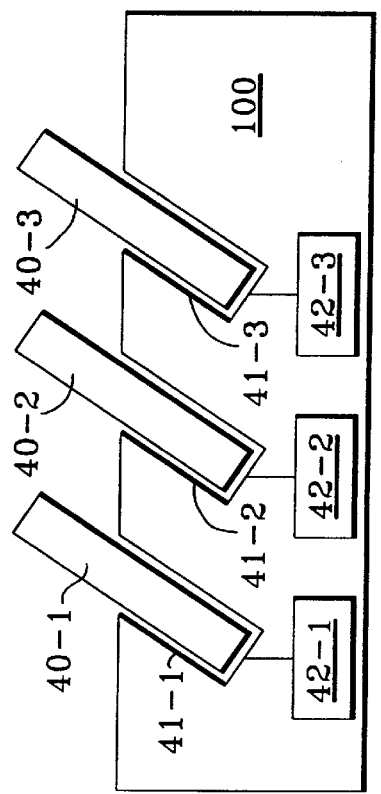
FIG. 6 is simplified side view of an example of the configuration of a charging apparatus in a different specific example of the present invention.
Figure 7B:
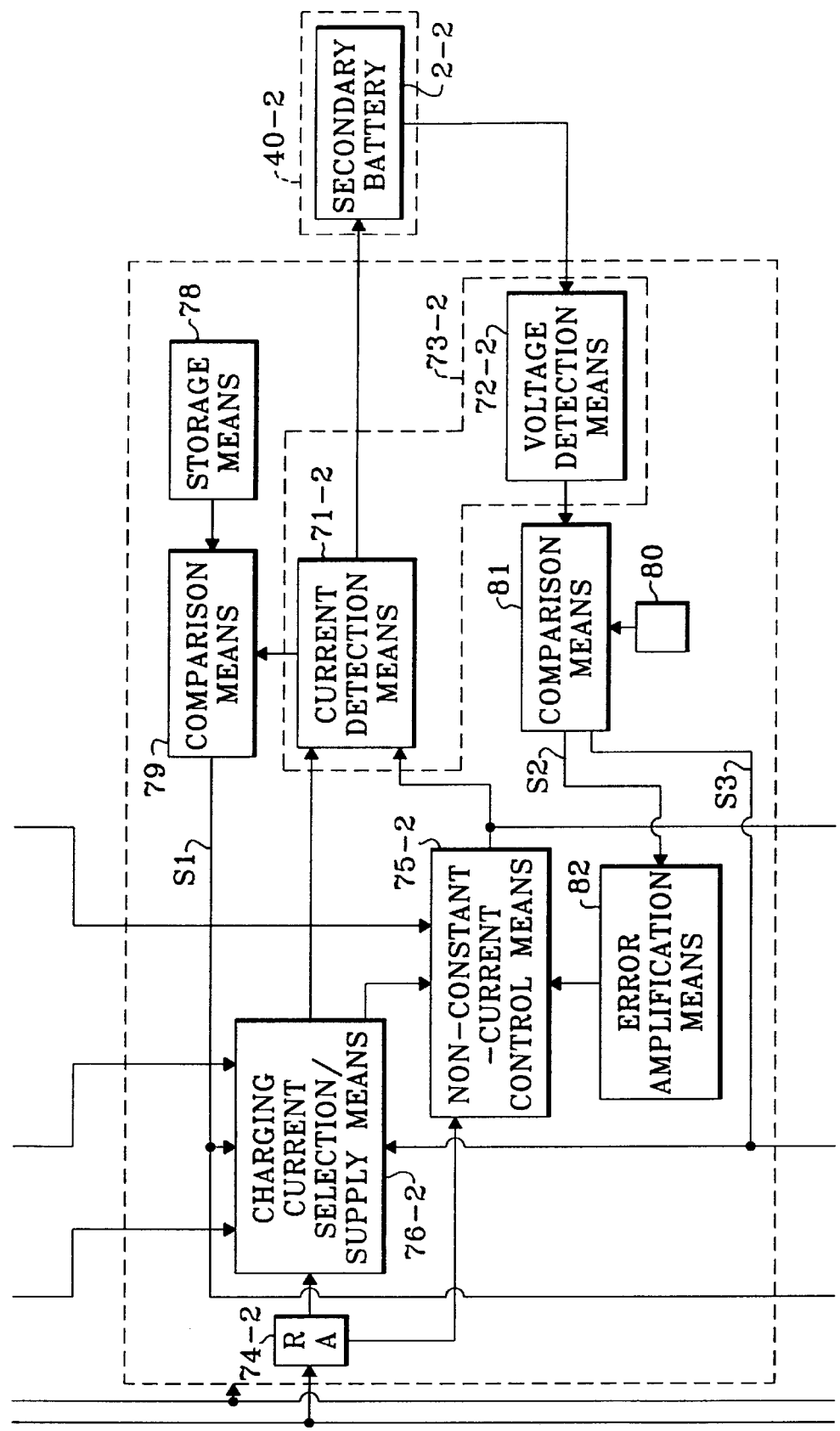
FIG. 7 is a block diagram that shows an example of the configuration of a charging apparatus that uses the different specific example that is shown in FIG. 6.
Figure 7C:
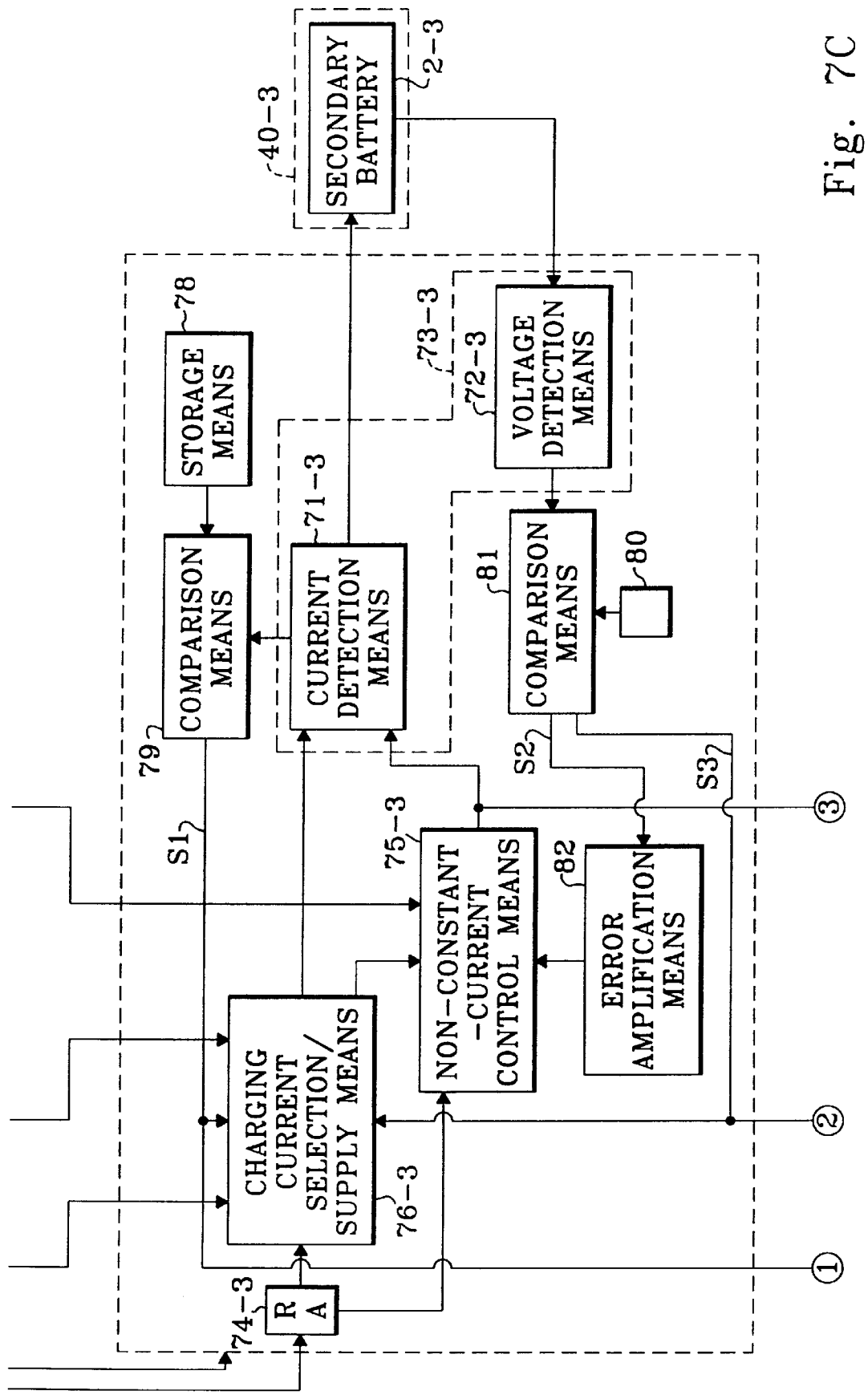

Specifically, the specific example of the charging apparatus 100 according to the present invention is provided with, for example as shown in FIG. 6 and FIG. 7, a plurality of secondary battery insertion parts 41-1, 41-2, and 41-3, into which a plurality of secondary battery packs 40-1, 40-2, and 40-3 are simultaneously mounted. This apparatus also has voltage and current detection means 73-1, 73-2, and 73-3, which separately detect the output voltage of the secondary batteries 2-1, 2-2, and 2-3 that are provided in the secondary battery insertion parts 41-1, 41-2, and 41-3, respectively and the charging current supplied to the secondary batteries 2-1, 2-2, and 2-3; constant-current control means 74-1, 74-2, and 74-3; non-constant-current control means 75-1, 75-2, and 75-3; charging current selection/supply means 76-1, 76-2, and 76-8 which selectively supply a constant current or a non-constant current to the secondary batteries 2-1, 2-2, and 2-3, respectively, which are disposed in the plurality of secondary battery insertion parts; and a charging current control means (CPU) 77 which performs overall control of the above-noted elements.

The charging current control means 77 has within it a program which operates in response to the first stage, in which the secondary battery is charged by a constant current and the second stage, in which the secondary battery is charged by a constant voltage and, in response to a voltage value or charging current value detected from the secondary battery pack whereby at the point at which the first stage of charging the first secondary battery starts, the charging of the second secondary battery is not started, and at the point at which a transition is made to the second stage of charging with respect to the first secondary battery, a first preparatory charging operation with respect to the second secondary battery is started, by supplying a charging current thereto which is the charging current supplied in the second stage to the first secondary battery subtracted from the maximum charging current supplied in the firsts stage to the first secondary battery.

At a point in time at which a transition is made to the third stage of charging the first secondary battery, or when the charging operation of the first secondary battery is completed, either a second preparatory charging operation with respect to the second secondary battery is stared, by supplying a charging current thereto which is the charging current in the third stage with respect to the first secondary battery subtracted from the maximum charging current in the first stage that is supplied to the first secondary battery, or control is performed so as to repeat the charging operations so that the first stage of charging with respect to the second secondary battery is started.

The operation and configuration of the charging apparatus 100 of this example of the present invention can be described in further detail as follows. Specifically, the charging current selection/supply means 76-1, 76-2, and 76-3 are formed by appropriate switching circuits, and are connected to the constant-current control means 74-1, 74-2, 74-3 and to the non-constant-current control means 75-1, 75-2, and 75-3 and, in response to a control signal that is output in response to an output value of the current detection means and voltage detection means to be described later, execute operation so as to establish whether the secondary battery 2 is to be supplied with a constant current, supplied with a non-constant current, or be completely cut off from current.

The voltage/current detection means 73-1, 73-2, and 73-3 in this example are formed by the current detection means 71-1, 71-2, and 71-3 and the voltage detection means 72-1, 72-2, and 72-3, respectively. The current detection means 71-1, 71-2, and 71-3 monitor the current value being supplied to the secondary batteries 2-1, 2-2, and 2-3, respectively, and the outputs of these are connected to the comparison means 79-1, 79-2, and 79-3, respectively, which are in turn connected to the storage means 78-1, 78-2, and 78-3, respectively, which store a minimum current value for the purpose of judging whether or not it is time to stop the charging operation of the secondary batteries 2-1, 2-2, and 2-3, respectively. These comparison means 79-1, 79-2, and 79-3 make a judgment as to whether the current value supplied to the secondary batteries 2-1, 2-2, and 2-3, respectively, is a lower current value than a pre-established minimum current value, and these comparison means 79-1, 79-2, and 79-3, respectively, output a signal charging stopping signal S1 so as to cause operation of the switching circuits 76-1, 76-2, 76-3, respectively, thereby stopping the supply of current to the secondary battery 2-1, 2-2, and 2-3, respectively.

The voltage detection means 72-1, 72-3, and 72-3 monitor the charging voltage of the secondary batteries, and a comparison is made by the comparison means 81-1, 81-2, and 81-3, respectively, between the battery voltage and a pre-established reference voltage value Vref. If the charging voltage of the secondary batteries 2-1, 2-2, and 2-3, respectively, exceeds a pre-established target reference voltage value Vref, the comparison means 81-1, 81-2, and 81-3, respectively, output a signal S3 to the switching circuits 76-1, 76-2, and 76-3, respectively, causing the circuits to be driven so that a switch is made from charging with a constant current to charging with a non-constant current.

At the comparison means 81-1, 81-2, and 81-3, a calculation is made of the difference value between the monitored value of the secondary batteries 2-1, 2-2, and 2-3, respectively, an with output signal S2 that indicates the results of that comparison being output therefrom.

The signal S2 passes through, for example, the error amplification means 82-1, and is then supplied to the non-constant-current control means 75-1, 75-2, and 75-3, these non-constant-current control means 75-1, 75-2, and 75-3 performing adjustment of the output current so that the difference value is made zero.

Additionally, the non-constant-current control means 75-1, 75-2, and 75-3, as will be described below, have a function which, in response to the current supply stopping signal S1 from another secondary battery pack insertion part, subtract the charging current being currently used in other secondary battery insertion parts from a pre-established prescribed current value, and output this difference value current.

Additionally, the charging current selection/supply means 76-1, 76-2, and 76-3, which are formed by switching circuits, each have input to them the charging stopping signal S1 from the other secondary battery insertion parts and, in response to a condition in which the charging operation at the other secondary battery insertion parts is stopped, these charging current selection/supply means 76-1, 76-2, and 76-3, as will be described below, are configured so as to start a first stage charging operation after a preparatory charging operation.

Next, an example of performing a charging operation on a plurality of secondary battery simultaneously, using the charging apparatus 100, will be described for the case of performing charging using the constant-current/constant-voltage method as done in the past.

Figure 8:
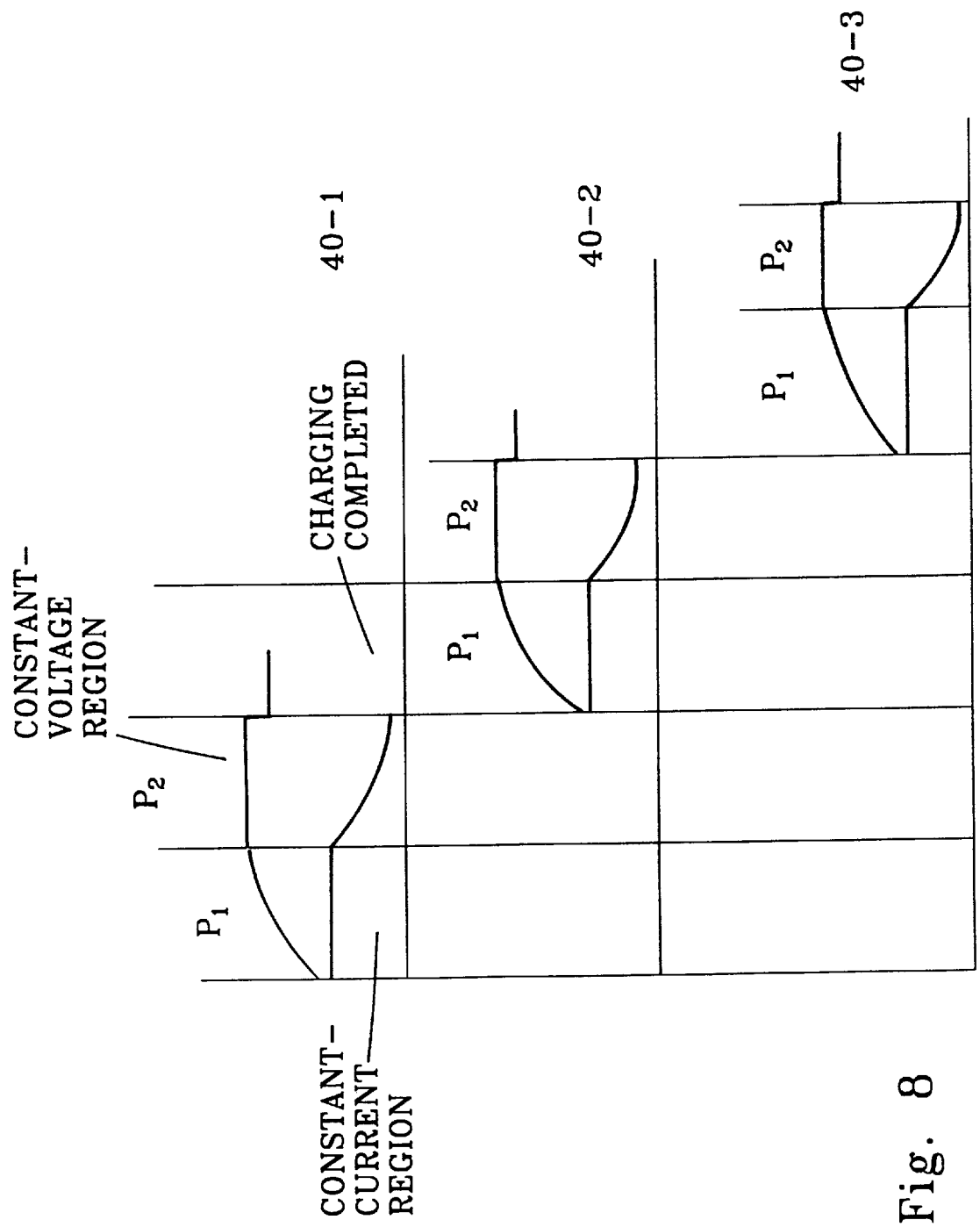
FIG. 8 is a drawing that illustrates an example of a secondary battery charging apparatus in the past.

FIG. 8 is a timing diagram that shows the case in which a plurality of secondary batteries are each charged individually. As is clear from FIG. 8, when the first secondary battery pack 40 is first inserted into the charging apparatus, at the first stage P1 charging is done by constant current, and at the subsequent stage P2, charging is done by constant voltage.

During this period of time, the other secondary battery packs 40-2 and 40-3 do not participate in the charge at all, and it is only after the completion of the charging operation with respect to the first secondary battery pack 40-1 that the second secondary battery pack 40-2 is inserted, whereupon the prescribed charging operation with respect to the second secondary battery pack 40-2 is started.

Therefore, in the charging method of the past, when charging a plurality of secondary batteries simultaneously, the situation existed in which the amount of time required for charging was the amount of time required to charge one secondary battery times the number of secondary batteries.

Figure 9:
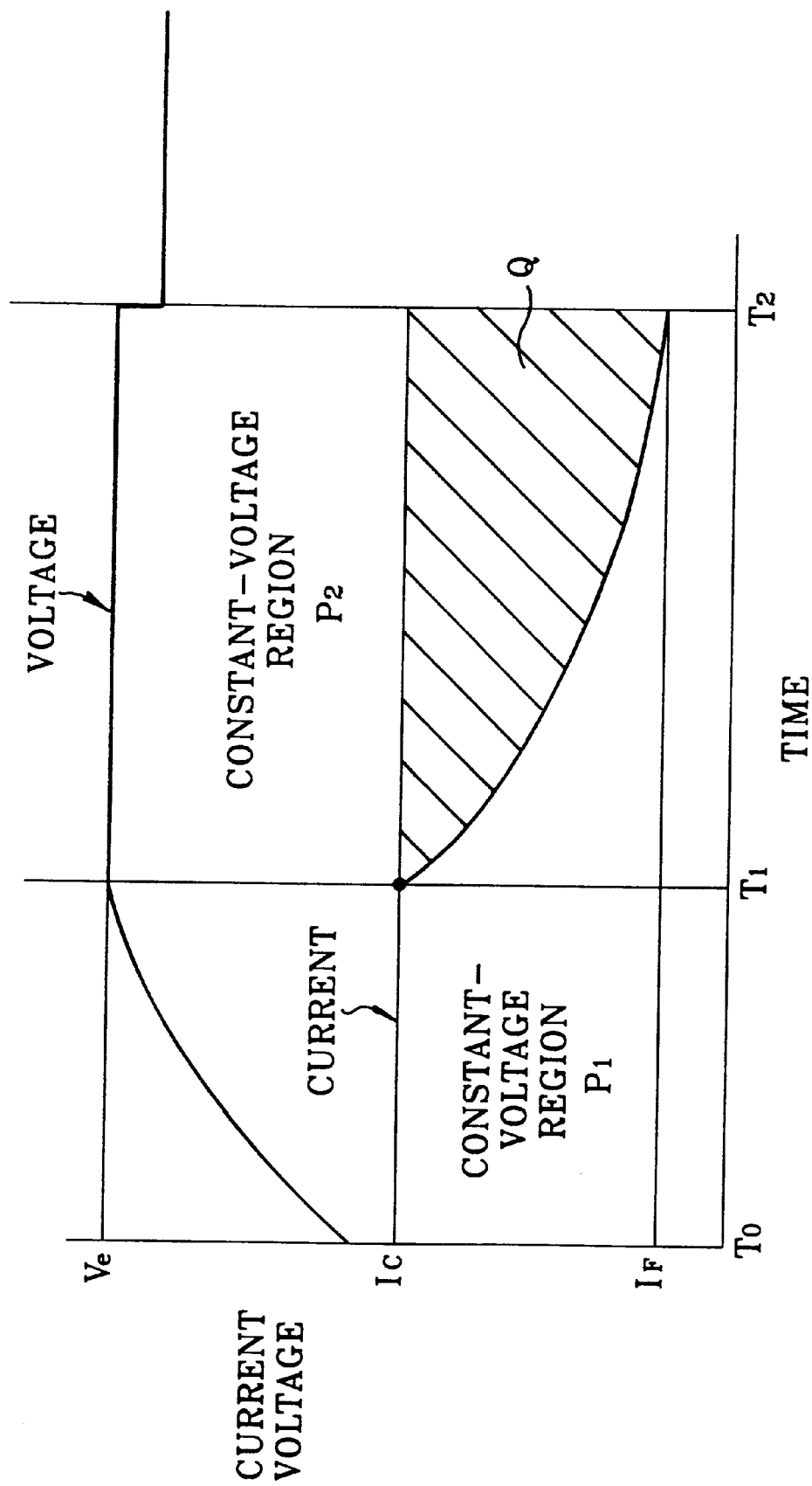
FIG. 9 is a graph that shows the principle in the case of a using one and the same charging apparatus according to the present invention to simultaneously charge a plurality of secondary batteries.

In contrast to this, with the present invention, as shown in FIG. 9, it is possible to simultaneously and continuously charge a plurality of secondary batteries, with the stage of charging between them being skewed one stage at a time, and because it is also possible to shorten the charging time for each of the stages, it is possible to achieve a great shortening of the overall time required for charging a plurality of secondary batteries.

At this point, the above-noted charging apparatus as principle thereof for charging a plurality of secondary batteries simultaneously will now be described.

Specifically, as shown in FIG. 9, if we consider the use of a constant-current/constant-voltage method to charge a lithium battery or lead battery, at the starting point T0 a pre-established constant current Ic is supplied to the secondary battery, thereby starting the charging operation. As time elapses, the charging voltage of this secondary battery rises, and at time T1, the charging voltage reaches a pre-established prescribed voltage Ve.

The above-noted period of time is known as the constant-current charging region, this being defined with regard to the present invention as the P1 charging stage.

After time T1, at which the charging voltage of the secondary battery reaches the prescribed voltage Ve, constant-voltage charging begins, the charging voltage applied to the secondary battery being maintained at the above-noted prescribed voltage Ve, and the charging current being controlled so as to be gradually reduced, thus describing a curve such as shown in the drawing.

The above-noted period of time is known as the constant-voltage charging region, this being defined with regard to the present invention as the P2 charging stage.

That is, in charging in accordance with the present invention, in the second stage of charging processing, although the charging apparatus is capable of supplying the maximum current Ic using in the first stage for charging, by performing constant-voltage charging, the amount of current supplied is reduced, with the shaded region shown in FIG. 9 representing the amount of reserve charging capacity of the power supply.

Therefore, by using this excess charging capacity in preparatory charging of the next secondary battery to be charged, it is possible to achieve preparatory charging of another secondary battery, after which the main charging thereof is performed, the result being that the amount of time required for charging thereof will be reduced to the degree that the preparatory charging was performed.

In the above-noted example of the present invention, the above-noted principle is applied to perform simultaneous charging of a plurality of secondary batteries.

Figure 10:
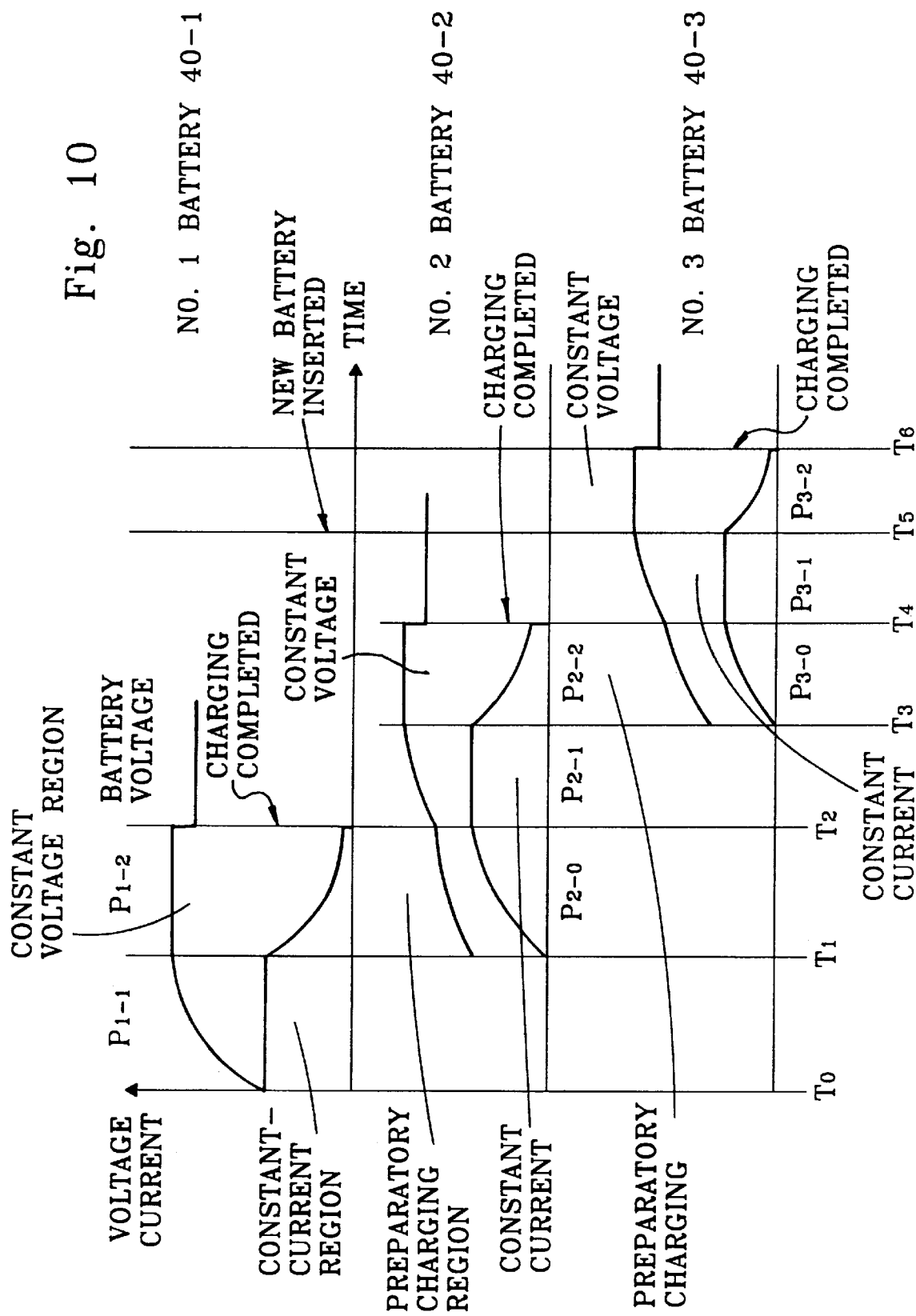
FIG. 10 is a timing diagram that shows the procedure for the case of performing simultaneous charging of a plurality of secondary batteries using a constant-current/constant-voltage method.

The operating procedure for the above-noted example is described below, with reference being made to FIG. 10.

Specifically, this description is for the case in which three secondary battery packs, 40-1, 40-2, and 40-3 are provided in a single charging apparatus 100, these being charged simultaneously.

First, the charging control means 77 selects the first secondary battery insertion part 41-1, and performs constant-current/constant-voltage charging of the secondary battery pack 40-1.

That is, at time T0, with respect to the secondary battery 40-1, a prescribed voltage is supplied to the constant-current control means 74-1 from the constant-voltage power supply 70, a pre-established maximum allowable current being supplied from the constant-current control means 74-1 to the secondary battery, the first charging stage P1 starting and continuing until time T1.

During this period of time the charging voltage of the secondary battery 2-1 rises, this charging voltage being monitored by the voltage detection means 72-1, the detected charging voltage value of the secondary battery 2-1 being compared at the comparison means 81-1 with a pre-established reference voltage value Vref.

This reference voltage value Vref is set to, for example, 4.2 V in the case in which the secondary battery 2-1 is a lithium battery.

Then, when the secondary battery 2-1 charging voltage reaches the above-noted reference voltage value Vref, a charging stage switching signal S3 is output to the charging current selection/supply means 76-1 from the comparison means 81-1, the charging current selection/supply means 76-1 being thereby switched to constant-voltage charging operation, at which point the second charging stage P2 starts.

In this second charging stage P2, as described above, because the charging voltage value is controlled so as to be constant, the current gradually decreases, as shown in the drawing.

While this control is executed by the above-noted non-constant-current control means 75-1, more specifically the charging voltage value of the secondary battery 2-1 that is detected by the above-noted voltage detection means 72-1 and the reference voltage value Vref are compared at the comparison means 81-1, the difference value therebetween being sent as the error signal S2, via the error amplification means 82-1, to the non-constant-current control means 75-1, which accepts this as an input.

At the non-constant-current control means 75-1, in response to this error signal S2, supplies to the secondary battery 2-1 a current that is controlled so that the difference value is zero, thereby establishing the attenuation curve of the current value as described above.

Then the charging current that is supplied to the secondary battery 2-1 from the non-constant-current control means 75-1, as noted above, is monitored by the current detection means 71-1, this charging current is compared at the comparison means 79-1 with a minimum charging current for the purpose of stopping the charging operation, this having been stored in a prescribed storage means 78-1. If the charging current value has become smaller than the above-noted minimum charging current value, a charging stopping signal S1, which stops the charging, is output to the charging current selection/supply means 76-1, thereby stopping the supply of current to the secondary battery 2-1, and this T2 point in time the charging operation with respect to the secondary battery 2-1 is completed.

At the time T1, when the above-noted charging stage switching signal S3 is output from the comparison means 81-1 related to the charging of the first secondary battery 2-1, this charge stage switching signal S3 is also applied to the charging current selection/supply means 76-2 in the circuit that controls the first secondary battery pack 40-2, this charging current selection/supply means thereupon activating the non-constant-current control means 75-2 so as to start a preparatory charging operation.

At this stage, a preparatory charging operation is done with respect to the secondary battery 2-2 by the constant-current, this current being a difference value current obtained at the non-constant-current control means 75-2 by subtracting from the pre-established maximum allowable current value output from the constant-current control means 74-2 the actual current value that is output from the non-constant-current control means 75-1. Therefore, as shown in FIG. 10, during the preparatory charging time period between the point T1 and point T2, although the charging voltage of the secondary battery 2-2 increases, it does not increase to some determined level of charging voltage.

However, the charging operation with respect to the secondary battery 2-2 is in fact completed to some degree.

At the time T2, when the charging operation with respect to the secondary battery 2-2 is completed, because the associated charging stopping signal S1 is also applied to the charging current selection/supply means 76-2 that controls the secondary battery 2-2, the charging current selection/supply means 76-2 is switched so as to enable execution of constant-current charging, the above-noted constant current being supplied to the secondary battery 2-2 from the constant-current control means 74-2, thereby starting the first charging stage with respect to the secondary battery 2-2 at the time T2.

Thereafter and until time T3, constant-current charging is performed with respect to the secondary battery 2-2, at which point T3 constant-voltage charging of the secondary battery 2-2 is started, this representing the entering of the second charging stage. Then, after further performing the above-noted operations until time T4, the charging of the secondary battery 2-2 is completed.

During this period of time, at the point in time at which the secondary battery 2-2 transitions from constant-current charging to constant-voltage charging, based on the result of a comparison made by the voltage detection means 72-2, which controls the charging of the secondary battery 2-2, with the reference voltage value Vref, a charging stage switching signal S3 that is output from the comparison means 81-2 is also applied to the charging current selection/supply means 76-3, which controls the secondary battery 2-3, so that this charging current selection/supply means 76-3 activates the non-constant-current control means 75-3 in the same manner as described above, thereby causing the start of a preparatory charging operation.

Thereafter, in the same manner, the above-noted preparatory charging operation with respect to the secondary battery 2-3 is executed until the time T4, at which point, in accordance with operation similar to that described above, the first charging stage with respect to the secondary battery 2-3 is entered.

Thereafter each of these process steps is repeated.

At the time T5, the secondary battery 2-1, which is already completely charged, is removed from the secondary battery pack 40-1, a new secondary battery 2-4 that requires charging is inserted, and at this point a preparatory charging operation with respect to this new secondary battery 2-4 begins.

In the above-noted example of the present invention, in the preparatory charging operation as well, if the charging voltage of the secondary battery reaches a pre-established maximum charging voltage value of Vc, a transition to constant-voltage charging is made, without performing constant-current charging.

In this preparatory charging as well, it is necessary to perform monitoring for the fully charged condition.

In the above-noted example of the present invention, the current values taken from the above-noted constant-voltage source 70 are all and always the same, this value being the same as when charging a single battery.

Therefore, the usage ratio of the power supply is 100%, enabling a system with superior cost performance.

Figure 11:
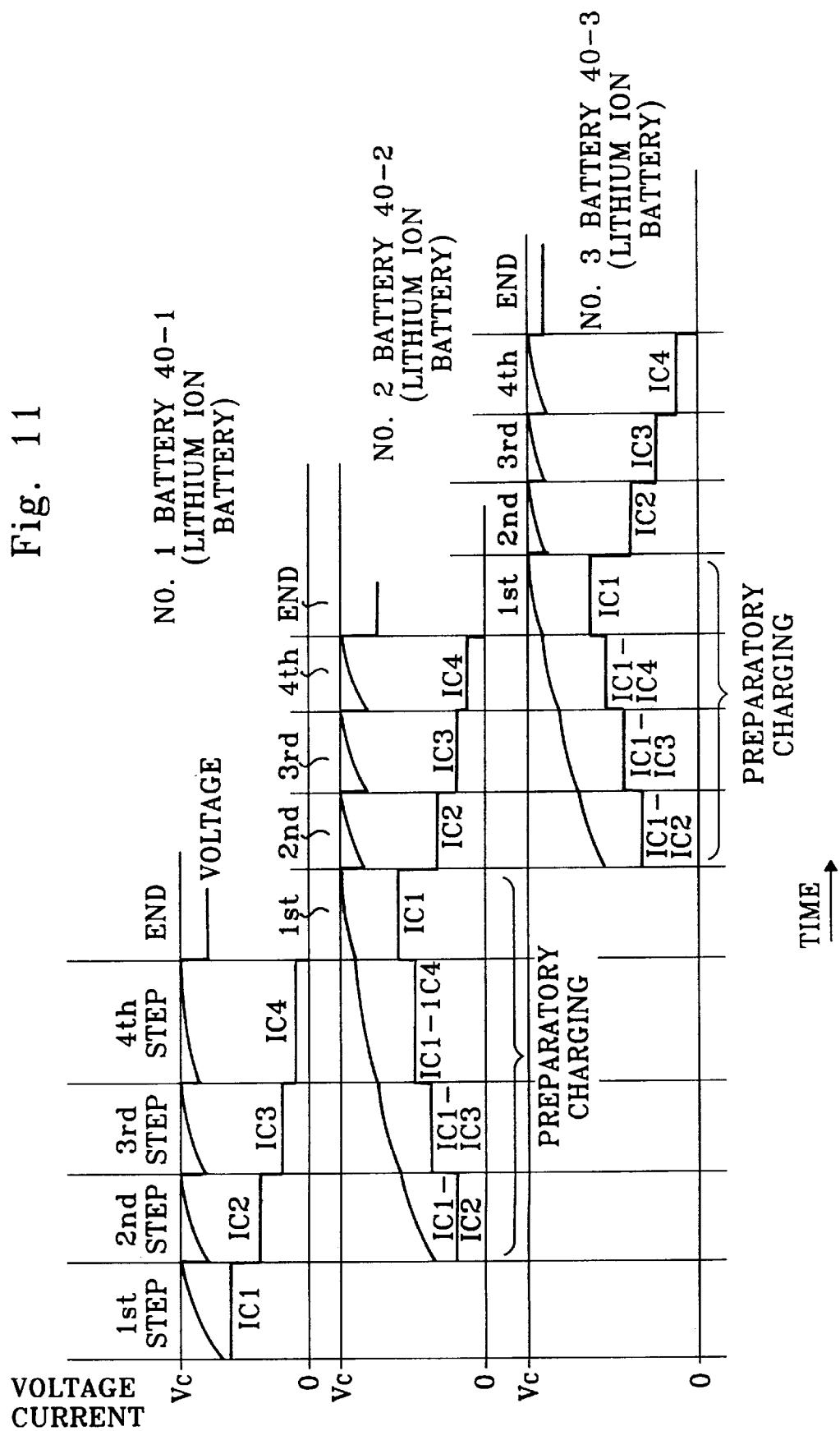
FIG. 11 is a timing diagram that shows the procedure for the case of performing simultaneous charging or a plurality of secondary batteries using a step-down method.

FIG. 11 is a timing diagram that shows the case of applying the above-noted example to the step-down method.

In this example as well, the principle of charging control is substantially the same as described above, and there is also no change in the circuit configuration.

In this example, because the step-down method is set in four stages, the first stage corresponds to the preparatory charging operation, and the second through fourth stages correspond to constant-voltage charging operations. At the second and subsequent stages, the difference current value between the maximum current value used in the first stage and the current values used in each of the second through fourth stages is used as the current for preparatory charging.

As is clear from FIG. 11, in this example, the period from the point at which the charging operation with respect to the first secondary battery 2-1 transitions to the second stage until it reaches the fourth stage is the preparatory charging period with respect to the first secondary battery 2-1, and at the point at which the charging operation with respect to the first secondary battery 2-1 ends, the first stage charging operation with respect to the second secondary battery 2-2 starts.

Thereafter, the same operation is repeated with respect to the third secondary battery 2-3 as well.

Figure 12:
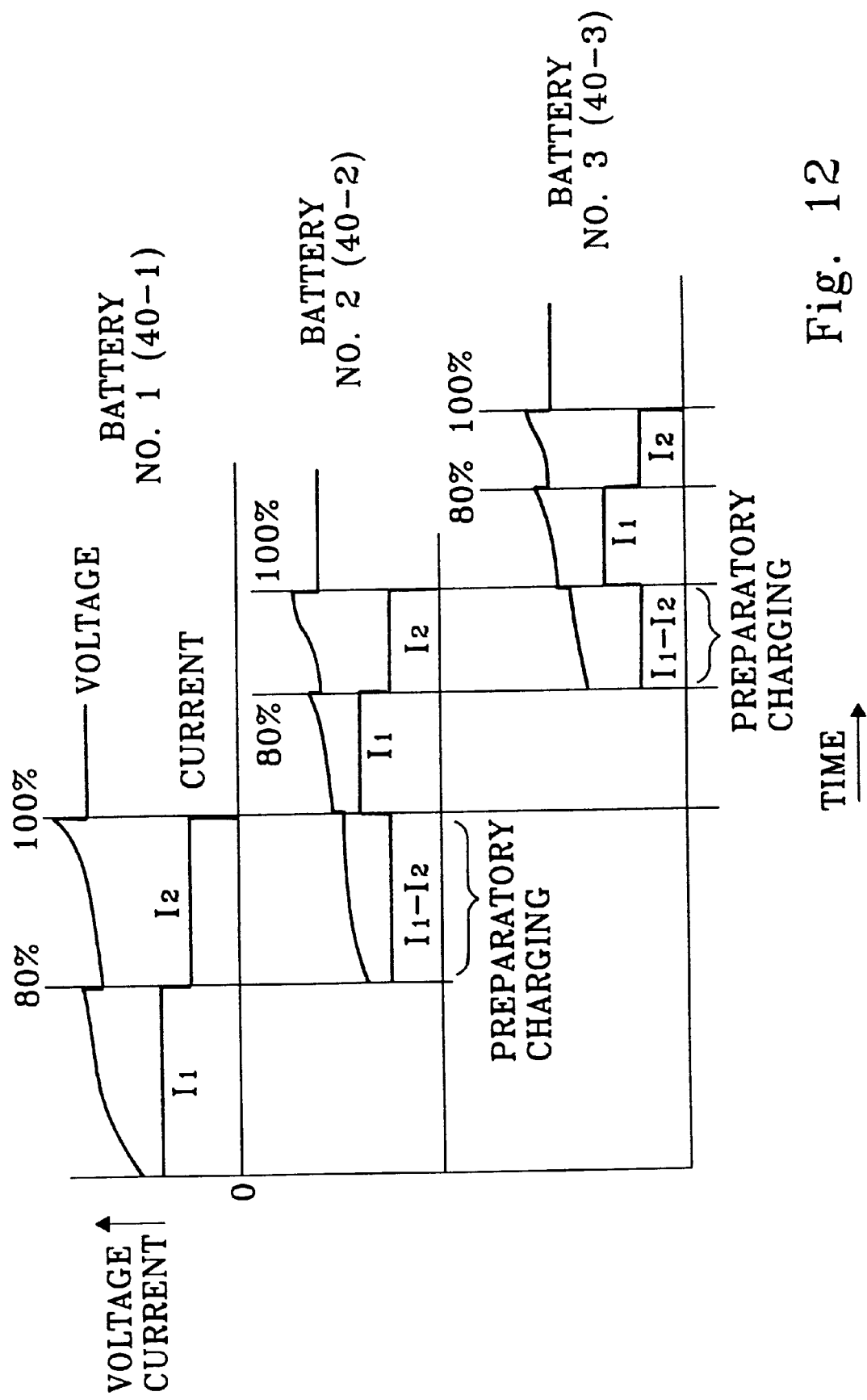
FIG. 12 is a timing diagram for the case in which charging processing is done as indicated above, for the case of using a nickel-cadmium secondary battery or a nickel-hydrogen secondary battery.

FIG. 12 is a timing diagram that shows the case of performing a charging operation similar to the above-noted operation, in particular with respect to a nickel-cadmium secondary battery or a nickel-hydrogen secondary battery.

In this example, the control that is performed is different from that in the earlier-described example.

Specifically, in a nickel-cadmium secondary battery or a nickel-hydrogen secondary battery, because of the characteristics of the battery, because of gas that is generated within the battery at the end of the charging operation, it is preferable to reduce the charging current to the battery early.

In this example, therefore, at the point at which the amount of charge reaches 80%, the charging current is reduced, the amount of this current reduction being used to perform preparatory charging of the next secondary battery.

Yet another aspect of the present invention of a secondary battery charging method according to the present invention is a storage medium in which is stored a program for execution by a computer of steps of a method to charge a secondary battery, according to which steps, at a first stage a prescribed charging current C1, expressed as a C rate, is supplied to the secondary battery, the output voltage of the secondary battery being monitored and, when the output voltage of the secondary battery reaches a pre-established voltage value, transition is made to a second stage, at which a charging current of C2 which is 1/N of C1 (where N is an arbitrary integer value or a real value with a decimal part), which was the current used in the first stage, is supplied to the secondary battery and, when the output voltage of the secondary battery reaches a pre-established voltage value that is one and the same with the above-noted pre-established voltage value, a transition is made to a third stage, at which a charging current C3 which is 1/M of C2 (where M is an arbitrary integer value or a real value with a decimal part and can also be equal to N), which was the current used in the second stage is supplied to the secondary battery, and thereafter the same is performed, so that each time the output voltage of the secondary battery reach a pre-established voltage value, the charging current that is supplied to the secondary battery is reduced by a prescribed ratio as charging of the secondary battery proceeds. In a charging apparatus which executes charging of a secondary battery, in the case in which the charging current drops below a pre-established prescribed current value, or when a pre-established prescribed number of stages have elapsed the charging of the secondary battery is stopped, when charging a plurality of secondary batteries simultaneously using one and the same charging apparatus, at the point at which the first stage of charging the first secondary battery is started, the charging of the second secondary battery is not started and, at the point at which a transition is made to the second stage of charging the first secondary battery, a first preparatory charging operation is started with respect to the second secondary battery, by supplying thereto a current that is the charging current that is supplied in the second stage of charging to the first secondary battery subtracted from the maximum charging current in the first charging step with respect to the first secondary battery.

At the point at which a transition is made to the third stage of charging the first secondary battery, a secondary preparatory charging of the second secondary battery is started, by supplying a charging current thereto which is the charging current supplied to the first secondary battery in the third stage subtracted from the maximum charging current supplied in the first stage of charging of the first secondary battery. Thereafter the same operations are performed and, when the charging of the first secondary battery proceeds to the next stage, a charging current that is the charging current supplied to the previous secondary battery in the next stage subtracted from the maximum charging current in the first stage to the first secondary battery is applied to the second secondary battery, a plurality of preparatory charging operations being performed until the charging operations with respect to the first secondary battery are completed, at which point the main charging operation with respect to the second secondary battery is started.

Yet another aspect is a storage medium in which is stored a program for execution by a computer of steps of a method for execution by a computer of a method to charge a second battery, according to which steps, in a charging apparatus in which at a first stage a secondary battery is charged by means of constant-current charging, during which time the output voltage of the secondary battery gradually rises and, when the output voltage of the secondary battery reaches a pre-established prescribed voltage value, the second stage is entered, in which a switch is made to constant-voltage charging, during which time the charging current is caused to decrease gradually and, when the amount of charging current falls below a pre-established prescribed current value, in charging a plurality of secondary batteries simultaneously with one and the same charging apparatus, at the point at which the first stage of charging the first secondary battery is started, the charging of the second secondary battery is not started and, at the point at which a transition is made to the second stage, preparatory charging is started with respect to the second secondary battery by supplying thereto a charging current that is the charging current supplied to the first secondary battery in the second stage subtracted from the maximum charging current supplied in the first stage to the first secondary battery, and the point at which the charging operation with respect to the first secondary battery ends, the preparatory charging of the second secondary battery is caused to stop, simultaneously with which the first charging stage with respect to the second secondary battery starts, after which the second stage of charging with respect to the first secondary battery starts.

By using the charging system and charging apparatus as described in detail above, in a each of the secondary battery charging apparatuses described, by accurately detecting the timing and condition of reaching the fully charged condition of the secondary battery and performing charging of the secondary battery using a charging system capable of charging a secondary battery devised to maintain a fully charged condition at all times, a charging system and apparatus therefor are provided which are capable of efficient charging.

In particular with regard to lithium ion batteries or lead batteries, the present invention provides a charging system that is capable of achieving a charging time of 100 minutes or less, and with regard to other types of secondary batteries, is capable of completing the charging operation in a time ranging from over ten to several tens of minutes.

Additionally, by shifting the charging cycle while charging a plurality of secondary batteries in one and the same charging apparatus, it is possible with the present invention to perform charging with good efficiency and in a short period of time.

What is claimed is:

1. A method for charging a secondary battery, wherein at a first stage a prescribed charging current C1, expressed as a C rate, is supplied to a secondary battery, the output voltage of said secondary battery being monitored and, when said output voltage of said secondary battery reaches a pre-established voltage value, a transition is made to a second stage, at which a charging current C2, which is 1/N of C1 (where N is an arbitrary integer value or a real value with a decimal part), which was the current used in said first stage, is supplied to said secondary battery and, when said output voltage of said secondary battery reaches a pre-established voltage that is one and the same with said pre-established voltage, a transition is made to a third stage at which a charging current C3 which is 1/M of C2 (where M is an arbitrary integer value or a real value with a decimal part and can also be equal to N), which was the current used in said first stage, is supplied to said secondary battery and thereafter same is performed, so that each time said output voltage of said secondary battery reaches a pre-established voltage value, said charging current that is supplied to said secondary battery is reduced by a prescribed ratio as charging of said secondary battery proceeds, and wherein when using a charging method which employs switching regulator which causes the amount of said charging current to vary in accordance with the duty cycle of one pulse, said method of charging a secondary battery is a method in which the configuration is such that a protective circuit is provided so that a voltage greater than a pre-established voltage value is not applied to an output terminal of the secondary battery.

2. A method for charging a secondary battery, wherein at a first stage constant-current charging of a secondary battery is performed, during which time period the output voltage of said secondary battery gradually increases and, when said output voltage of said secondary battery reaches a pre-established voltage value, a switch is made to constant-voltage charging operation, during which time period the charging current is caused to decrease gradually and, when said charging current falls below a pre-established current value, said charging operation with respect to said secondary battery is caused to stop, and wherein when using said charging method by employing a switching regulator which causes the amount of said charging voltage to vary in accordance with the duty cycle of one pulse, said charging method is configured so that a protective circuit is provided so that a voltage greater than a pre-established voltage value is not applied to an output terminal of the secondary battery.

3. A method for charging a secondary battery according to either claim 1 or claim 2, wherein in a case in which said protective circuit is provided in a prescribed charging apparatus, it is configured so as to be disposed in series fashion between a power supply of said charging apparatus and said secondary battery.

4. A method for charging a secondary battery according to claim 3, wherein when supplying a charging voltage to said secondary battery from a power supply terminal of said charging apparatus, a voltage that is compensated for a voltage drop of said protective circuit is supplied to said output terminal of said secondary battery from said output terminal of said power supply.

5. A method for charging a secondary battery according to claim 1, wherein in a case in which said output voltage of said secondary battery is within a range of ±1% with respect to a pre-established output rating value with respect to said secondary battery, a judgment is made that said output voltage value of said secondary battery has reached a pre-established voltage value.

6. A method for charging a secondary battery according to any one of claims 1, 2, or 5, wherein a third terminal part that is connected to an output terminal of said secondary battery is provided separately from connection terminals of said protective circuit, and wherein an auxiliary terminal that is connected to said third terminal of said secondary battery is provided, so that monitoring of a true output voltage value from said secondary battery is performed at a charging apparatus side.

7. A method for charging a secondary battery according to claim 6, wherein said true output voltage value of said secondary battery, which is detected by said auxiliary terminal, is compared with a target reference voltage value of said secondary battery, compensation adjustment of the voltage that is applied to said protective circuit being adjusted to achieve compensation, so that said difference value is zero.

8. A method for charging a secondary battery according to any one of claims 1, 2, or 5, wherein in a case in which a prescribed voltage is detected from said third electrode, the voltage that is supplied to said protective circuit is temporarily cut off.

9. A system for charging a secondary battery comprising:
   a secondary battery pack provided with a first terminal part, a second terminal part and a third terminal part;
   a charging apparatus provided with a positive terminal part, a negative terminal part and an auxiliary terminal part, wherein said positive terminal part is configured to make contact with said first terminal part, said negative terminal part is configured to make contact with said second terminal part and said auxiliary terminal part is configured to make contact with said third terminal part;
   further wherein said secondary battery pack includes:
      a protective circuit having one end connected to said first terminal part and another end that is connected to an output terminal of said secondary battery;
      a second terminal part that is connected to an input terminal of said secondary battery; and
      a third terminal part that is directly connected to said output terminal of said secondary battery; and
      a control means which, in reponse to a voltage value of said output terminal of said secondary battery, which is detected by said auxiliary terminal part, performs control so that a voltage that is compensated for a voltage drop of said protective circuit is applied to said terminal part.

10. A system for charging a secondary battery according to claim 9, wherein said control means comprises:
   a voltage adjustment means that is connected to a power supply;
   a current detection means that is connected to said voltage adjustment means, and which has its output connected to said positive terminal part;
   a voltage comparison means that is connected to said auxiliary terminal part, and which is also connected to a prescribed reference voltage power supply;
   an error amplification means having an input that is connected to an output of said voltage comparison means and and output that is connected to said voltage adjustment means; and
   a maximum current control means that has an input that is connected to said current detection means and an output that is connected to said voltage adjustment means.

11. A method for charging a secondary battery, wherein at a first stage a prescribed charging current C1, expressed as a C rate, is supplied to a secondary battery, the output voltage of said secondary battery being monitored and, when said output voltage of said secondary battery reaches a pre-established voltage value, a transition is made to a second stage, at which a charging current C2, which is 1/N of C1 (where N is an arbitrary integer value or a real value with a decimal part), which was the current used in said first stage, is supplied to said secondary battery and, when said output voltage of said secondary battery reaches a pre-established voltage that is one and the same with said pre-established voltage, a transition is made to a third stage at which a charging current C3 which is 1/M of C2 (where M is an arbitrary integer value or a real value with a decimal part and can also be equal to N), which was the current used in said second stage, is supplied to said secondary battery and thereafter same is performed, so that each time said output voltage of said secondary battery reaches a pre-established voltage value, said charging current that is supplied to said secondary battery is reduced by a prescribed ratio as charging of said secondary battery proceeds, and further in performing charging in a charging apparatus which charges a plurality of secondary battery and which stops charging a secondary battery in a case in which either said charging current has fallen below a pre-established prescribed current value or a pre-established number of charging stages have elapsed, at a point in time at which the first stage of charging of a first secondary battery starts, charging of a second secondary battery is not started and, at a point in time at which a transition is made to a second stage of charging said first secondary battery, a first preparatory charging operation with respect to a second secondary battery is started by supplying a charging current thereto that is charging current that is supplied to the first secondary battery in the second stage subtracted from the maximum current supplied to said first secondary battery in said first stage, and at a point in time at which a transition is made to a third stage of charging said first secondary battery, a second preparatory charging operation of said second secondary battery is started, by supplying a charging current thereto that is charging current supplied to said first secondary battery in said third stage subtracted from the maximum charging current supplied to said first secondary battery in said first stage, after which the same operations are performed, and when the charging operations of said first secondary battery proceed to the next stage, a charging current that is the charging current supplied to the secondary battery in the next stage subtracted from the maximum charging current supplied to the first secondary battery in the first stage is applied to said second secondary battery, a number of preparatory charging operations being executed until the completion of the charging of said first secondary battery, and at a point in time at which the charging operation with respect to said first secondary battery is completed, a main charging operation with respect to said second secondary battery is started.

12. A method for charging a secondary battery wherein, in a charging apparatus so that at a first stage a secondary battery is charged by a constant-current charging operation, during which time period the output voltage of said secondary battery gradually increases and, when said output voltage of said secondary battery reaches a prescribed voltage value, a second stage is entered, at which point a switch is made to constant-voltage charging, during which time period the charging current is caused to decrease gradually and, when said charging current falls below a pre-established current value, the charging operation with respect to said secondary battery is stopped, in charging a plurality of secondary batteries simultaneously with one and the same charging apparatus, at a point in time at which the first stage of charging with respect to a first secondary battery is started, the charging operation with respect to a second secondary battery is not started and, at a point at which a transition is made to said second stage of charging with respect to said first secondary battery, a preparatory charging operation is started with respect to said second secondary battery, by supplying thereto a charging current that is the charging current supplied in the second stage to the first secondary battery subtracted from the maximum charging current supplied to said first secondary battery in said first stage, and at the point of completion of the charging operation with respect to said first secondary battery, the preparatory charging operation with respect to said second secondary battery is stopped, simultaneously with which a first stage of charging operation with respect to said second battery is started, followed by starting of the second stage of charging with respect to the first secondary battery.

13. A method of charging a secondary battery according to either claim 11 or claim 12, wherein a secondary battery for which charging has been completed is replaced by a different secondary battery that requires charging, each stage of charging operation being sequentially repeated.

14. A battery comprising:
a secondary battery;
a protective circuit, one end of which makes connection with an output terminal part of said secondary battery;
a first terminal part which is connected to another end of said protective circuit;
a second terminal part which is connected to a negative electrode part of said secondary battery; and
a third terminal part which is directly connected to said output terminal part of said secondary battery.

15. A charging apparatus for a secondary battery which accepts a secondary battery as recited in claim 14, said charging apparatus being provided with a positive electrode part and a negative electrode part which make separate physical contact with said first and second terminal parts provided on said secondary battery pack, and also being provided with a control means which, in response to a voltage value of the output terminal part of said secondary battery, which is detected at said auxiliary terminal part, performs control so that a voltage that is compensated for a voltage drop of said protective circuit is applied from said positive electrode part to said first terminal part of said secondary battery.

16. A charging apparatus for a secondary battery according to claim 15, wherein said control means comprises:
a voltage adjustment means that is connected to a power supply;
a current detection means that is connected to voltage adjustment means, and which has its output connected to said positive electrode part:
a voltage comparison means that is connected to said auxiliary terminal part, and which is also connected to a prescribed reference voltage power supply;
an error amplification means having an input that is connected to an output of said voltage comparison means and an output that is connected to said voltage adjustment means; and
a maximum current control means that has an input that is connected to said current detection means and an output that is connected to said voltage adjustment means.

17. A charging apparatus for a secondary battery comprising:
a secondary battery insertion part into which a plurality of secondary battery packs are simultaneously mounted;
a voltage/current detection means which separately detects an output voltage from and the charging current supplied to of each of said secondary batteries provided in said insertion secondary battery pack insertion part;
a constant-current source;
a constant-voltage source; and
a charging current selection/supply means which selectively supplies a charging current to said plurality of secondary batteries, and a charging processing control means,
said charging processing control means operating in response to a first stage in which said secondary batteries receive a charging operation by a constant current, a second stage in which said secondary batteries receive a charging operation by a constant voltage, wherein in response to a voltage value or a charging current value detected from the output of said secondary battery pack, at a point in time at which a first stage of charging of a first secondary battery starts, a charging operation with respect to a second secondary battery is not started and, at a point in time at which a transition is made to a second stage of charging with respect to said first secondary battery, a first preparatory charging operation with respect to said second secondary battery is started, by applying a charging current thereto that is a charging current that is supplied to said first secondary battery at the second stage subtracted from the maximum charging current that is supplied to said first secondary battery at the first stage and, at a point at which a transition is made to a third stage of charging with respect to said first secondary battery, either a second preparatory charging operation with respect to said second secondary battery is started, by supplying a charging current thereto that is the charging current supplied to said first secondary battery in said third stage subtracted from the maximum charging current supplied to said first secondary battery in said third stage, or a first stage of charging is started with respect to said second secondary battery, said processing being repeated.

18. A storage medium in which is stored a program for execution by a computer of steps of a method to charge a secondary battery, according to which steps, at a first stage a prescribed charging current C1, expressed as a C rate, is supplied to the secondary battery, the output voltage of said secondary battery being monitored and, when the output voltage of the secondary battery reaches a pre-established voltage value, transition is made to a second stage, at which a charging current of C2 which is 1/N of C1 (where N is an arbitrary integer value or a real value with a decimal part), which was the current used in the first stage, is supplied to the secondary battery and, when the output voltage of said secondary battery reaches a pre-established voltage value that is one and the same with said pre-established voltage value, a transition is made to a third stage, at which a charging current C3 which is 1/M of C2 (where M is an arbitrary integer value or a real value with a decimal part and can also be equal to N), which was the current used in said second stage is supplied to said secondary battery, and thereafter the same is performed, so that each time said output voltage of said secondary battery reaches a pre-established voltage value, the charging current that is supplied to said secondary battery is reduced as charging or the secondary battery proceeds, and in a case in which when the charging current drops below a pre-established prescribed current value, or when a pre-established prescribed number of stages have elapsed, the charging of the secondary battery is stopped, when charging a plurality of secondary batteries simultaneously using one and the same charging apparatus, at the point at which said first stage of charging said first secondary battery is started, the charging of said secondary battery is not started and, at the point at which a transition is made to said second stage of charging said first secondary battery, a first preparatory charging operation is started with respect to the second secondary battery, by supplying thereto a current that is the charging current that is supplied in said second stage of charging to said first secondary battery subtracted from the maximum charging current in said first charging step with respect to the first secondary battery, and at a point at which a transition is made to said third stage of charging said first secondary battery, a secondary preparatory charging of the second secondary battery is started, by supplying a charging current thereto which is the charging current supplied to said first secondary battery in the third stage subtracted from the maximum charging current supplied in the first stage of charging of said first secondary battery, after which the same operations are performed and, when the charging of said first secondary battery proceeds to the next stage, a charging current that is the charging current supplied to the previous secondary battery in the next stage subtracted from the maximum charging current in the first stage to the first secondary battery is applied to the second secondary battery, a plurality of preparatory charging operations being performed until the charging operations with respect to said first secondary battery are completed, at which point the main charging operation with respect to said second secondary battery is started.

19. A storage medium in which is stored a program for execution by a computer of steps of a method for execution by a computer of a method to charge a second battery, according to which steps, in a charging apparatus in which at a first stage a secondary battery is charged by means of constant-current charging, during which time the output voltage of the secondary battery gradually rises and, when said output voltage of said secondary battery reaches a pre-established prescribed voltage value, a second stage is entered, in which a switch is made to constant-voltage charging, during which time said charging current is caused to decrease gradually and, when the amount of said charging current falls below a pre-established prescribed current value, in charging a plurality of secondary batteries simultaneously with one and the same charging apparatus, at the point at which said first stage of charging a first secondary battery is started, the charging of a second secondary battery is not started and, at the point at which a transition is made to said second stage, preparatory charging is started with respect to said second secondary battery by supplying thereto a charging current that is the charging current supplied to the first secondary battery in said second stage subtracted from the maximum charging current supplied in the first stage to the first secondary battery, and the point at which the charging operation with respect to said first secondary battery ends, the preparatory charging of the second secondary battery is caused to stop, simultaneously with which said first charging stage with respect to the second secondary battery starts, after which the second stage of charging with respect to the first secondary battery starts.

\* \* \* \* \*

UNITED STATES PATENT AND TRADEMARK OFFICE
CERTIFICATE OF CORRECTION

PATENT NO. : 6,104,165
DATED : August 15, 2000
INVENTOR(S) : Miyamoto et al.

It is certified that error appears in the above-identified patent and that said Letters Patent is hereby corrected as shown below:

Claim 9,
Line 25, before "terminal" insert -- first --.

Claim 17,
Line 5, delete "and".

Signed and Sealed this

Sixth Day of November, 2001

Attest:

NICHOLAS P. GODICI
*Attesting Officer*  *Acting Director of the United States Patent and Trademark Office*